(12) United States Patent
Watanabe et al.

(10) Patent No.: US 8,115,888 B2
(45) Date of Patent: Feb. 14, 2012

(54) LIQUID CRYSTAL DISPLAY DEVICE

(75) Inventors: Jun Watanabe, Kanagawa (JP); Ryuji Saneto, Kanagawa (JP); Naohiro Matsunaga, Shizuoka (JP)

(73) Assignee: Fujifilm Corporation, Tokyo (JP)

( * ) Notice: Subject to any disclaimer, the term of this patent is extended or adjusted under 35 U.S.C. 154(b) by 829 days.

(21) Appl. No.: 12/109,242

(22) Filed: Apr. 24, 2008

(65) Prior Publication Data

US 2008/0266488 A1   Oct. 30, 2008

(30) Foreign Application Priority Data

Apr. 25, 2007   (JP) ............................... P.2007-115603

(51) Int. Cl.
*G02F 1/1335* (2006.01)

(52) U.S. Cl. ........................................................ 349/64

(58) Field of Classification Search ........................ None
See application file for complete search history.

(56) References Cited

U.S. PATENT DOCUMENTS

| | | | |
|---|---|---|---|
| 6,343,865 B1 | 2/2002 | Suzuki | |
| 7,430,358 B2 * | 9/2008 | Qi et al. | 385/146 |
| 7,663,712 B2 * | 2/2010 | Lee | 349/64 |
| 2003/0147140 A1 * | 8/2003 | Ito | 359/599 |
| 2005/0063062 A1 | 3/2005 | Ito et al. | |

FOREIGN PATENT DOCUMENTS

| | | |
|---|---|---|
| JP | 2003-270409 A | 9/2003 |
| JP | 3507719 B2 | 12/2003 |

* cited by examiner

*Primary Examiner* — Richard Kim

(74) *Attorney, Agent, or Firm* — Birch, Stewart, Kolasch & Birch, LLP

(57) ABSTRACT

A liquid crystal display device includes a light source, at least one optical member having a periodic structure of 75 μm or more, pixels disposed in a matrix state, and at least one optical member with light scattering properties.

14 Claims, 4 Drawing Sheets

LIQUID CRYSTAL DISPLAY DEVICE

CROSS-REFERENCE TO RELATED APPLICATIONS

This application claims the benefit of Japanese Patent Application JP 2007-115603, filed Apr. 25, 2007, the entire content of which is hereby incorporated by reference, the same as if set forth at length.

FIELD OF THE INVENTION

The present invention relates to a liquid crystal display device.

BACKGROUND OF THE INVENTION

As a display device which is used for OA appliances such as monitors for word processors, notebook personal computers and personal computers, mobile terminals, television sets and the like, a cathode ray tube (CRT) has been mainly used until now. In recent years, a liquid crystal display device is being widely used in place of CRT because it is slim, lightweight and low in consumed electric power. The liquid crystal display device includes a liquid crystal cell and a polarizing plate. The polarizing plate is in general composed of a protective film and a polarizing film and obtained by dyeing a polarizing film composed of a polyvinyl alcohol film with iodine, stretching it and stacking the both surfaces thereof by a protective film. In a transmission type liquid crystal display device, this polarizing plate is installed on the both sides of the liquid crystal cell, and in some cases, one or more optically compensatory sheets are further disposed. Also, in a reflection type liquid crystal display device, in general, a reflector plate, a liquid crystal cell, one or more optically compensatory sheets and a polarizing plate are disposed in this order. The liquid crystal cell generally has a liquid crystal molecule, two substrates for enclosing it and an electrode layer for applying voltage to the liquid crystal molecule. As to the liquid crystal cell, there are proposed display modes which undergo ON-OFF display in conformity with a difference in alignment state of the liquid crystal molecule and are applicable to any of a transmission type, a reflection type and a semi-transmission type, such as TN (twisted nematic) display mode, an IPS (in-plane switching) display mode, an OCB (optically compensatory bend) display mode, a VA (vertically aligned) display mode, an ECB (electrically controlled birefringence) display mode and an STN (super twisted nematic) display mode.

The optically compensatory sheet is employed in various liquid crystal display devices for the purposes of dissolution of image coloration and enlargement of a viewing angle. As the optically compensatory sheet, a stretched birefringent polymer film has hitherto been used. It has been proposed to use an optically compensatory sheet having an optically anisotropic layer formed of a low molecular or high molecular liquid crystalline compound on a transparent support in place of the optically compensatory sheet composed of a stretched birefringent film. Since the liquid crystalline compound includes various alignment forms, by using a liquid crystalline compound, it has become possible to realize optical properties which could not be obtained through related-art stretched birefringent polymer films. Furthermore, such an optically compensatory sheet functions as a protective film of polarizing plate, too.

On the other hand, image display devices such as CRT, plasma display (PDP), electroluminescence display (ELD), field emission display (FED), surface-conduction electron-emitter display (SED) and liquid crystal display device (LCD) are able to enhance the display performance under a bright room circumstance by preventing glare of an image on the display surface to be caused due to reflection of external light.

Also, in recent years, a market of applications for viewing a video with high image quality from a relatively apart position using a display device having a large-sized screen represented by liquid crystal television sets is quickly spreading. In such applications, the display is required to display a clearer image.

As a method for preventing glare of an image onto the display surface of an image display device, there are disclosed (1) a method for making it difficult to recognize a glared image by imparting performance for vignetting an outline of the glared image (antiglare properties) by surface scattering properties; and (2) a method for making it difficult to recognize a glared image by imparting performance for minimizing the quantity of reflected light (antireflection properties) by providing a low refractive index layer on the most superficial layer of the display surface (see Japanese Patent No. 3507719 (corresponding to U.S. Pat. No. 6,343,865 B1) and JP-A-2003-270409 (corresponding to US2005/0063062A1)).

If the antiglare properties are strong, when a material placed in the surroundings of the display a fluorescent lamp, a human being or the like glares onto the display surface, an outline of the image vignettes, whereby a screen image of the display becomes easy for recognition (the glare is reduced). However, there is a possibility that a whitish-brown color feel of the display surface increases, whereby a contrast in a bright room (bright room contrast) is lowered. Also, in order to increase the visibility in a bright room, devising for strengthening light of backlight, for example, a converging member such as a prism sheet is employed.

SUMMARY OF THE INVENTION

However, in liquid crystal display devices using the foregoing optical member having scattering properties (for example, optical films and optical sheets), in the case where an optical member having periodicity such as the foregoing prism sheet is disposed between a backlight and a liquid crystal layer, fringe-shaped or concentric display unevenness called "moiré" is generated through interference with a periodic pattern of pixels of a liquid crystal cell. In particular, for the purpose of increasing the convergence of the optical member having periodicity or reducing the costs, in the case where the structure has a period of 75μ or more, the generation of moiré becomes remarkable, resulting in a problem.

Also, even in the case where a low refractive index layer is provided, it is required to more reduce the glare.

An aspect of the invention is to provide a liquid crystal display device having a high contrast in any of a bright room and a dark room and capable of minimizing the deterioration of an image quality to be caused due to moiré or the like.

The present inventors made extensive and intensive investigations. As a result, it has been found that by disposing an optimized light scattering film in a liquid crystal display device, not only moiré is reduced, but a high contrast is revealed. A reason for this is considered as follows. That is, by disposing an optimized light scattering film, light is scattered, whereby the periodicity as a cause of interference is reduced. On the other hand, the size of the scattering is not so large, whereby the contrast is not deteriorated.

That is, aspects of the present invention are as follows.

(1) A liquid crystal display device comprising a light source, at least one optical member having a periodic structure of 75 μm or more, pixels disposed in a matrix state and at least one optical member with light scattering properties.

(2) The liquid crystal display device as set forth above in (1), wherein the at least one optical member having a periodic structure of 75 μm or more has a periodic structure of 100 μm or more.

(3) The liquid crystal display device as set forth above in (1) or (2), wherein at least one of the at least one optical member having a periodic structure is a lenticular lens sheet.

(4) The liquid crystal display device as set forth above in any one of (1) to (3), wherein the at least one optical member with light scattering properties is disposed between the at least one optical member having a periodic structure and the pixels disposed in a matrix state.

(5) The liquid crystal display device as set forth above in any one of (1) to (3), wherein at least one of the at least one optical member with light scattering properties is disposed on an opposite side of the optical member having a periodic structure while sandwiching the pixels disposed in a matrix state.

(6) The liquid crystal display device as set forth above in any one of (1) to (5), wherein when a scattered light intensity of a scattered light profile measured by a goniophotometer with an acceptance angle of 2° at an output angle θ against the light source is defined as I(θ), the optical member with light scattering properties has a value of the following evaluation expression (1) of from 2.0 to 3.2.

$$I(3) \times d/L \times 1000 \quad (1)$$

In the foregoing expression, d represents a period of the optical member having a periodic structure; and L represents a distance between the optical member having a periodic structure and the optical member with light scattering properties.

(7) The liquid crystal display device as set forth above in any one of (1) to (5), wherein when a scattered light intensity of a scattered light profile measured by a goniophotometer with an acceptance angle of 2° at an output angle θ against the light source is defined as I(θ), the optical member with light scattering properties has a value of the following evaluation expression (2) of from 1.6 to 2.6.

$$(I(0)-I(1.5)) \times (1-I(0))/I(0) \times d/L \times 1000 \quad (2)$$

In the foregoing expression, d represents a period of the optical member having a periodic structure; and L represents a distance between the optical member having a periodic structure and the optical member with light scattering properties.

(8) The liquid crystal display device as set forth above in any one of (1) to (7), wherein the optical member with light scattering properties has a value of scattering intensity of a scattered light profile measured by a goniophotometer with an acceptance angle of 2° at an output angle of 30° against the light source is from $5.0 \times 10^{-6}$ to $5.0 \times 10^{-5}$.

(9) The liquid crystal display device as set forth above in any one of (1) to (8), wherein the at least one optical member with light scattering properties has surface light scattering properties.

(10) The liquid crystal display device as set forth above in any one of (1) to (9), wherein the at least one optical member with light scattering properties has a surface roughness Ra value of from 0.01 to 0.3 μm and an Sm value of from 20 to 200 μm.

(11) The liquid crystal display device as set forth above in any one of (1) to (10), wherein the at least one optical member with light scattering properties has a haze value of 20% or more.

(12) The liquid crystal display device as set forth above in any one of (1) to (11), wherein the at least one optical member with light scattering properties is a light scattering film having a light scattering layer on a transparent support.

(13) The liquid crystal display device as set forth above in any one of (1) to (12), wherein the at least one optical member with light scattering properties contains a particle and a binder, has both surface light scattering properties and particle scattering properties, has a surface roughness Ra of from 0.01 to 0.3 μm and has an Sm value of from 20 to 200 μm; a diameter of the particle is from 6 μm to 12 μm; and a relative refractive index of the particle and the binder is from 0.95 to 1.05.

(14) The liquid crystal display device as set forth above in any one of (1) to (13), wherein in the pixels disposed in a matrix state, a direction of periodicity thereof is coincident with a direction of periodicity of the optical member having a periodic structure.

(15) The liquid crystal display device as set forth above in any one of (1) to (14), wherein the liquid crystal display device has a diagonal length of a screen of 20 inches or more.

According to the invention, it is possible to provide a liquid crystal display device having a high contrast and capable of suppressing moiré.

Also, according to the invention, in a certain embodiment, it is possible to provide a liquid crystal display device capable of suppressing moiré and having a wide viewing angle characteristic and wide color reproducibility.

DESCRIPTION OF REFERENCE NUMERALS AND SIGNS

Figure 1:
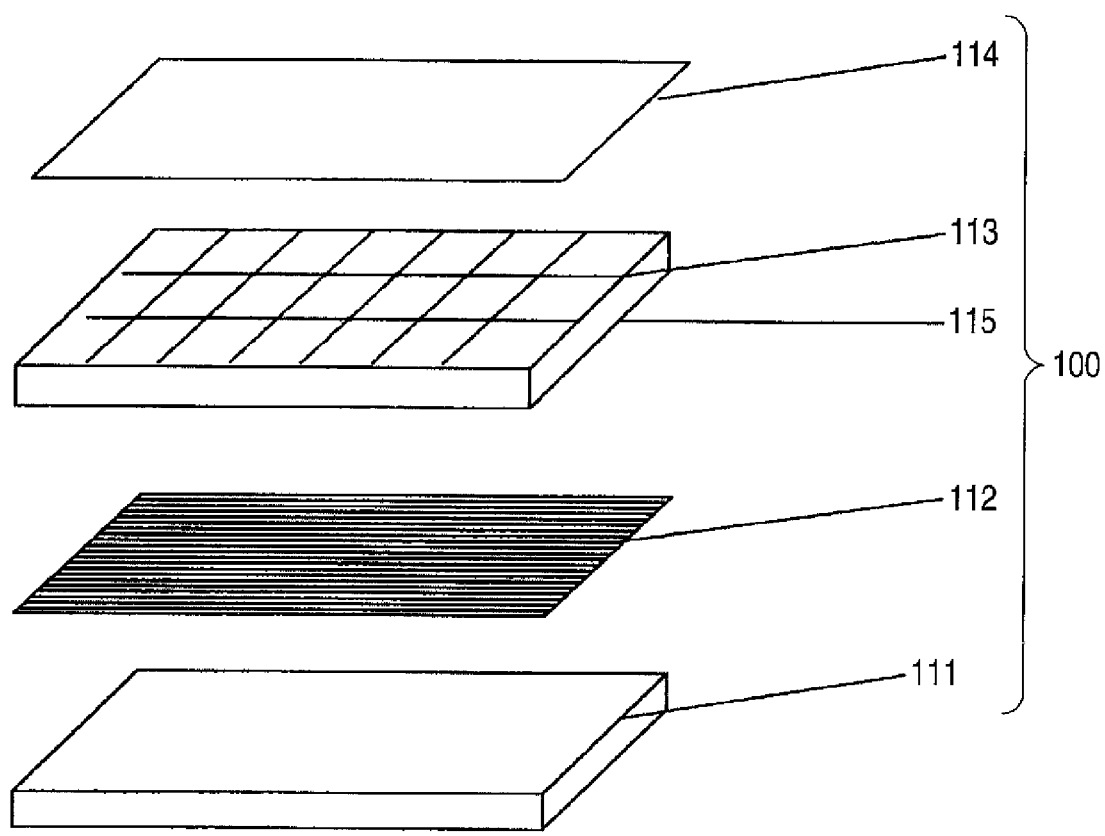
FIG. 1 is a schematic view showing a configuration of a liquid crystal display device of the invention.

100: Liquid crystal display device
111: Light source
112: Optical member having a periodic structure
113: Pixels disposed in a matrix state
114: Optical member with light scattering properties
115: Liquid crystal cell
VA 1: Upper polarizing plate
VA 2: Absorption axis of upper polarizing plate
VA 3: Upper optically anisotropic layer
VA 4: Slow axis direction of upper optically anisotropic layer
VA 5: Upper electrode substrate of liquid crystal cell
VA 6: Alignment control direction of upper substrate
VA 7: Liquid crystal layer
VA 8: Lower electrode substrate of liquid crystal cell VA 9: Alignment control direction of lower substrate
VA 10: Lower optically anisotropic layer 1
VA 11: Slow axis direction of lower optically anisotropic layer 1
VA 12: Lower optically anisotropic layer 2
VA 13: Slow axis direction of lower optically anisotropic layer 2
VA 14: Lower polarizing plate
VA 15: Absorption axis of lower polarizing plate
VA 16: Surface film of upper polarizing plate
VA 17: Surface film of lower polarizing plate
VA 18: Converging optical film
VA 19: Backlight
10: Coater
11: Backup roll
W: Web
13: Slot die
14: Coating solution
14$a$: Bead
14$b$: Coating film
15: Pocket
16: Slot
17: Tip lip
18: Land
18$a$: Upstream side lip land
18$b$: Downstream side lip land

DETAILED DESCRIPTION OF THE INVENTION

Figure 4:
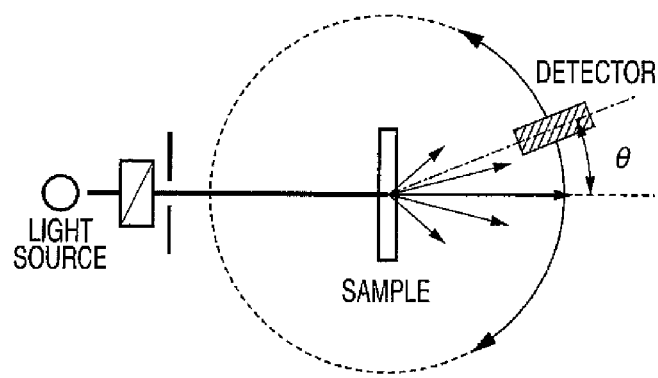
FIG. 4 is a schematic view showing one example of the measurement of a light scattering profile using a goniophotometer used in the invention.

Terminologies used in this specification are hereunder described.
[Transmittance]
A sample (20 mm×70 mm) was measured for transmittance to visible light (615 nm) at 25° C. and 60% RH by a transparency analyzer (AKA photoelectric calorimeter, manufactured by Kotaki Seisakusho, Ltd.).
[Spectral Characteristic]
A sample (13 mm×40 mm) was measured for transmittance at a wavelength of from 300 to 450 nm at 25° C. and 60% RH by a spectrophotometer (U-3210, manufactured by Hitachi, Ltd.) A tilt width was determined by {(wavelength of 72%)−(wavelength of 5%)}. A critical wavelength was expressed by a wavelength of {(tilt width)/2+5}%. An absorption edge was expressed by a wavelength at a transmittance of 0.4%. According to this, the transmittance at 380 nm and 350 nm was evaluated.
[Scattered Light Profile]
A sample (50 mm×40 mm) was measured for transmitted light scattering intensity on white light (liquid source: halogen lamp) at 25° C. and 60% RH by a goniophotometer (GonioPhotoMeter GP-5, manufactured by Murakami Color Research Laboratory Co. Ltd.). A diagrammatic view of the device is shown in FIG. 4. A transmitted light scattering intensity at an angle θ against a light source intensity when the sample was removed was measured as I(θ). Convergent light with an angle of 1.5° was used as the light source, and an acceptance angle of a detector was set up at 2°.
In this specification, with respect to the angle, "+" means a counterclockwise direction; and "−" means a clockwise direction. Also, when the upper direction of the liquid crystal display device is set up at a twelve o'clock direction, and the lower direction of the liquid crystal display device is set up at a six o'clock direction, the direction with an absolute value of 0° of the angle direction means a three o'clock direction (right-hand direction of screen). Also, the "slow axis" means a direction at which the refractive index is the maximum. Also, the "visible light region" refers to a region of from 380 nm to 780 nm. Furthermore, a measurement wavelength of the refractive index is a value at λ=550 nm in the visible light region unless otherwise indicated.

With respect to angles of the respective axes and directions, the terms "parallel", "vertical", "45°" and "coincident" mean "approximately parallel", "approximately vertical", "approximately 45°" and "approximately coincident", respectively but do not mean strict values. Slight deviations are tolerable within the ranges for achieving the respective objects. Preferred ranges of the terms "approximately parallel", "approximately vertical", "approximately 45°" and "approximately coincident" are hereunder defined.

The term "parallel" means that the crossing angle is approximately 0° and is from −10° to 10°, preferably from −5° to 5°, and more preferably from −3° to 3°.

The term "vertical" means that the crossing angle is approximately 90° and is from 80° to 100°, preferably from 85° to 95°, and more preferably from 87° to 93°.

The term "45°" means that the crossing angle is approximately 45° and is from 35° to 55°, preferably from 40° to 50°, and more preferably from 42° to 48°.

The term "coincident" means that the crossing angle is approximately 0° and is from −10° to 10°, preferably from −5° to 5°, and more preferably from −3° to 3°.

Also, in this specification, the term "polarizing plate" is used in a sense of including both a longitudinal polarizing plate and a polarizing plate cut in a size to be built in a liquid crystal device (in this specification, the term "cutting" includes "punching" and "cutting out") unless otherwise indicated. Also, in this specification, while the "polarizing film" and the "polarizing plate" are distinctly used, the "polarizing plate" means a stack in which a protective film is provided on at least one surface of the "polarizing film" for the purpose of protecting the polarizing film. Furthermore, the polarizing plate may include an optically compensatory film. In that case, the protective film may be configured so as to also serve as the optically compensatory film. In the case where the optically compensatory film is a stack composed of an optically anisotropic layer having a liquid crystal molecule on a support, the protective film may be configured so as to also serve as the support of the optically compensatory film. Furthermore, the polarizing plate of the invention may include a support. Also, there may be the case where the "optically compensatory film" is used in the same meanings as in an optically anisotropic layer or an optically compensatory film.

An embodiment of the liquid crystal display device according to the invention is hereunder described with reference to FIG. 1.

As shown in FIG. 1, a liquid crystal display device 100 according to this embodiment is configured to have a light source 111, an optical member 112 having a periodic structure, pixels 113 disposed in a matrix state and an optical member 114 with light scattering properties. Furthermore, the pixels 113 disposed in a matrix state are disposed in contact with a liquid crystal cell 115 or disposed in the liquid crystal cell 115.

The light scattering properties of the optical member with light scattering properties may be surface light scattering properties or may be particle light scattering properties, or may be light scattering properties having the both scattering properties.

Furthermore, in order to increase the brightness of the light source, a convergence type brightness-enhancing sheet having a prism-shaped or lens-shaped periodic structure may be used as the optical member 112 having a periodic structure. Also, a diffusion sheet (film) having a periodic structure for making the light source of a backlight uniform may be used.

Conversely, a sheet (film) in which a reflection or diffusion pattern for bringing the light source with in-plane distribution is formed by printing may be used. With respect to the periodicity, there may be employed an optical member having periodicity of a one-dimensional direction or an optical member having periodicity of a two-dimensional direction. Also, such an optical member may be one having complete periodicity or may be one having both periodicity and random properties.

Figure 2:
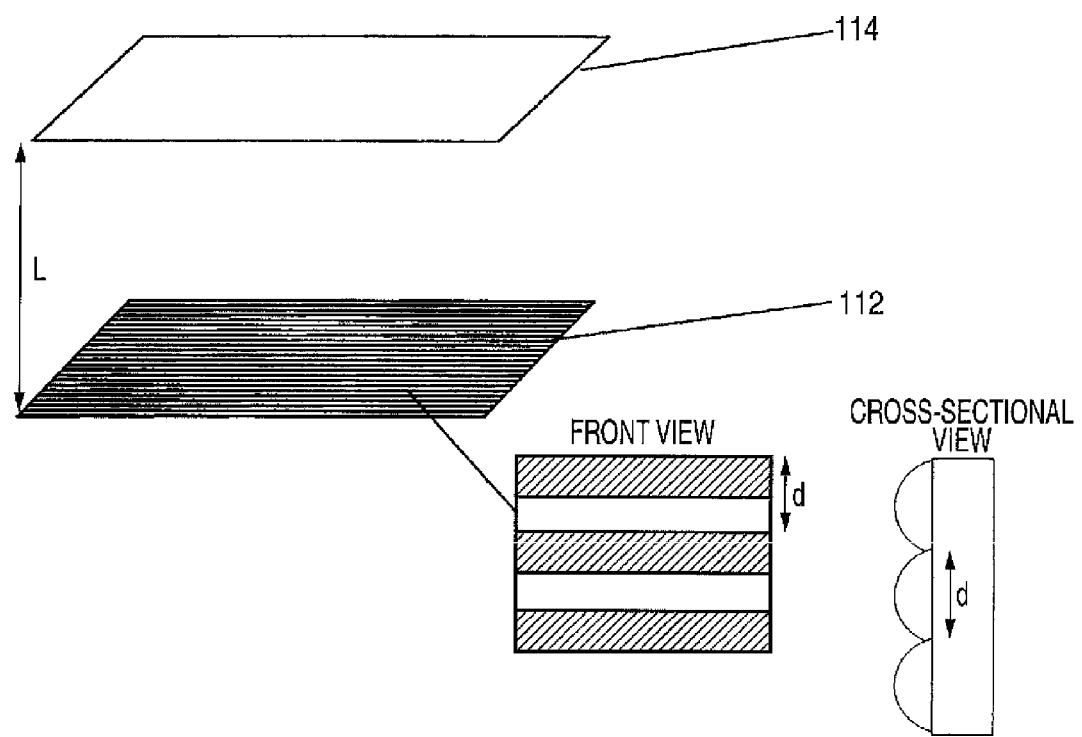
FIG. 2 shows a period d of an optical member having a periodic structure and a distance L between the optical member having a periodic structure and an optical member with light scattering properties in the invention.

A relative relationship of the disposition of the respective configuration members is shown in FIG. 2. The period of the optical member 112 having a periodic structure is defined as "d"; and a distance between the optical member 112 having a periodic structure and the optical member 114 with light scattering properties is defined as "L".

At that time, it is preferable that when a scattered light intensity of a scattered light profile measured by a goniophotometer with an acceptance angle of 2° at an output angle θ against the light source is defined as I(θ), the optical member 114 with light scattering properties has a value of the following evaluation expression (1) of from 2.0 to 3.2.

$$I(3) \times d/L \times 1000 \quad \text{Evaluation Expression (1)}$$

In the foregoing expression, d represents a period of the optical member having a periodic structure; and L represents a distance between the optical member having a periodic structure and the optical member with light scattering properties.

As another method, it is preferable that when a scattered light intensity of a scattered light profile measured by a goniophotometer with an acceptance angle of 2° at an output angle θ against the light source is defined as I(θ), the optical member with light scattering properties has a value of the following evaluation expression (2) of from 1.6 to 2.6.

$$(I(0)-I(1.5)) \times (1-I(0))/I(0) \times d/L \times 1000 \quad \text{Evaluation Expression (2)}$$

In the foregoing expression, d represents a period of the optical member having a periodic structure; and L represents a distance between the optical member having a periodic structure and the optical member with light scattering properties.

In addition to the above, it is preferable that the optical member 114 with light scattering properties has a value of scattering intensity of a scattered light profile measured by a goniophotometer with an acceptance angle of 2° at an output angle of 30° against the light source is from $5.0 \times 10^{-6}$ to $5.0 \times 10^{-5}$.

In the liquid crystal display device of the invention, when the periodicity of the optical member having a periodic structure is made uniform by the optical member with light scattering properties, moiré generated between the optical member having a periodic structure and pixels disposed in a matrix state is reduced. In order to make the periodicity of the optical member having a periodic structure uniform, when the distance between the optical member having a periodic structure and the optical member with light scattering properties is closer, or the period of the optical member having a periodic structure is larger, it is necessary that the light scattering properties of the optical member with light scattering properties is strengthened. Accordingly, the foregoing relational expressions have been derived.

Also, a light scattering angle necessary for making the periodicity uniform may be an angle sufficient for making the adjacent structures of the periodic structure uniform, and it is preferable that the light is scattered within an angle range of exceeding 0° and not more than 10°. Wide-angle light scattering often lowers a contrast of the display in a normal direction. Therefore, it is preferable that wide-angle scattering of 30° or more is small. Accordingly, the optical member with light scattering properties is preferably an optical member having large light scattering properties within the range of exceeding 0° and not more than 10° and having small light scattering properties of 30° or more.

<Liquid Crystal Display Device>
[Configuration of Liquid Crystal Display Device]

The liquid crystal display device of the invention is a liquid crystal display device having a liquid crystal cell having a liquid crystal layer including a pair of substrates disposed opposite to each other, at least one of which has an electrode, and a nematic liquid crystal material interposed between the substrates and aligned substantially vertically against the surfaces of the pair of electrodes at the time when no voltage is applied; and a polarizing plate disposed on at least one surface of the outside of the liquid crystal cell. It is preferable that this polarizing plate has a first protective film, a polarizing film, a second protective film and a light diffusion layer in this order.

It is preferable to use a VA type liquid crystal display device, a TN type liquid crystal display device, an OCB type liquid crystal display device or an IPS liquid crystal display device as the liquid crystal display device of the invention.

The VA type liquid crystal display device produces normally black display in which when no voltage is applied, black display is produced, whereas when voltage is applied, the transmittance increases to produce white display. The black display is obtained when an Re value of the optically compensatory film and a retardation value of the liquid crystal layer in a state that voltage is applied are coincident with each other. In such a configuration, not only an image with a high contrast can be obtained over a wide range, but gradation inversion is not generated even in a normal display region.

Figure 3:
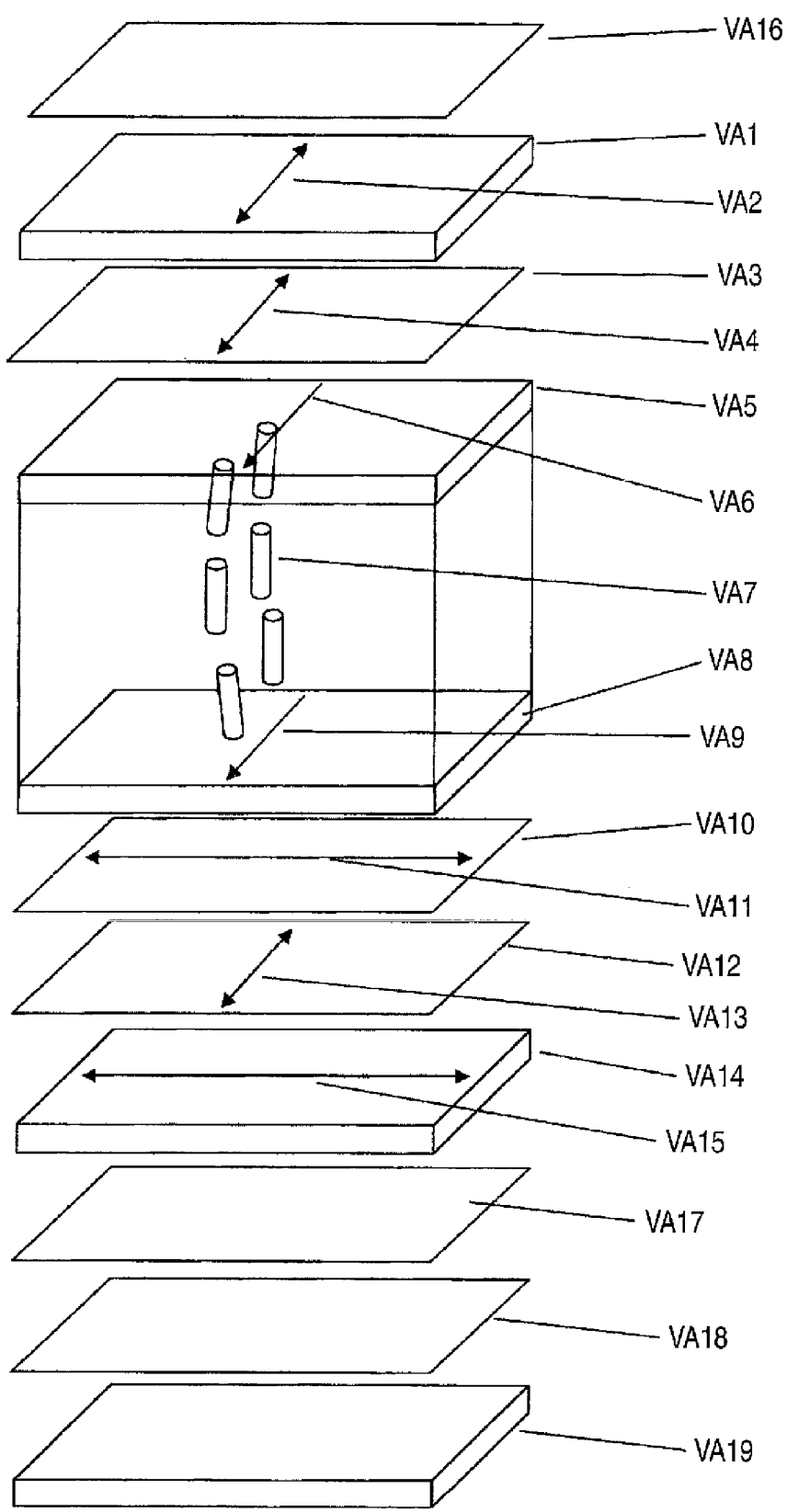
FIG. 3 is a schematic view of an embodiment of a VA mode liquid crystal displayer device.

A liquid crystal display device as shown in FIG. 3 has liquid crystal cells (VA 5 to VA 9) and an upper polarizing plate VA 1 and a lower polarizing plate VA 14 disposed so as to interpose these liquid crystal cells therebetween. The polarizing plate is interposed by a polarizing film and a pair of transparent protective films. However, in FIG. 3, the polarizing plate is shown as an integrated polarizing plate, and a detailed structure thereof is omitted. In the VA mode, a liquid crystal having negative dielectric anisotropy and having a Δn of about 0.0813 and a Δ∈ of about −4.6 (for example, Merck's MLC-6608) is prepared at a tilt angle of about 89° against a director exhibiting an alignment direction of the liquid crystal molecule, so-called "substrate surface" by means of rubbing alignment. A thickness d of the liquid crystal layer VA 7 is set up at 3.5 μm. Here, the brightness at the time of white display varies depending upon the size of the product Δnd of the thickness d and the refractive index anisotropy Δn. For that reason, in order to obtain the maximum brightness, the product Δnd is set up in the range of from 0.2 to 0.5 μm, and preferably in the range of from 0.25 to 0.35 μm.

An absorption axis VA 2 of the upper polarizing plate VA1 and an absorption axis VA 15 of the lower polarizing plate VA 14 are stacked substantially orthogonally to each other. A transparent electrode (not illustrated) is formed in the inside of an alignment film of each of the upper electrode substrate VA 5 and the lower electrode substrate VA 8. In a non-drive state that no drive voltage is applied to the electrode, the liquid crystal molecule in the liquid crystal layer is aligned substantially vertically against the substrate surface as in the liquid crystal layer VA7. As a result, the polarization state of light passing through a liquid crystal panel does not substantially change. That is, in the liquid crystal display device, ideal black display is realized in the non-drive state. On the other hand, in the drive state, the liquid crystal molecule is inclined substantially parallel to the electrode substrate surface, and light passing through a liquid crystal panel changes the polarization state due to such an inclined liquid crystal molecule. In another word, in the liquid crystal display device, white display is obtained in the drive state.

Here, since an electric field is applied between the upper and lower electrode substrates, an example of using a liquid crystal material with negative dielectric anisotropy such that the liquid crystal molecule responds vertically against the electric field direction is shown. Also, in the case where an electrode is disposed in one electrode substrate, and an electric field is applied in a lateral direction parallel to the substrate surface, a liquid crystal material with positive dielectric anisotropy is used. Also, in a VA-mode liquid crystal display device, the addition of a chiral reagent which is generally used in a TN mode liquid crystal display device is scarcely employed because a dynamic response characteristic is deteriorated. However, for the purpose of reducing defective alignment, there may be the case where the chiral reagent is added.

Characteristic features of the VA mode reside in high response and high contrast. However, there is a problem that though the contrast is high in the front direction, it is deteriorated in the oblique direction. The liquid crystal molecule is aligned vertically against the substrate surface at the time of black display. When observed from the front, since there is substantially no birefringence of the liquid crystal molecule, the transmittance is low, and a high contrast is obtained. However, when observed from the oblique direction, birefringence is generated in the liquid crystal molecule. Furthermore, though a crossing angle of the upper and lower polarizing plate absorption axes is orthogonal as 90° in the front direction, when observed from the oblique direction, it is larger than 90°. Because of these two factors, light leakage is generated in the oblique direction, and the contrast is lowered. In order to solve this problem, it is preferable to dispose an optically compensatory sheet (an upper optically anisotropic layer VA 3, a lower optically anisotropic layer 1 VA 10 and a lower optically anisotropic layer 2 VA 12 in FIG. 3). Also, at the time of white display, the liquid crystal molecule is inclined, whereas in the reverse direction to the inclination direction, when observed from the oblique direction, the size of birefringence of the liquid crystal molecule is different, whereby a difference in brightness or color tone is generated. In order to solve this problem, a structure called "multi-domain", in which one pixel of the liquid crystal display device is divided into plural regions, is employed.

In the embodiment of the transmission type liquid crystal display device of the invention as shown in FIG. 3, in cellulose acylate films to be used as the protective film, the protective films VA 3 and VA 12 used on the liquid crystal side may be the same film or may be a different film. Also, the protective films VA 3 and VA 12 may be used as an optically compensatory sheet which also serves as a protective film.

Surface films (VA 16 and VA 17) in FIG. 3 may be a usual cellulose acylate film and are preferably thinner than the cellulose acylate film which is preferably used in the invention. For example, its thickness is preferably from 40 to 80 μm, and examples of the cellulose acylate film include commercially available products such as KC4UX2M (40 μm in thickness, manufactured by Konica Opto Corporation), KC5UX (60 μm in thickness, manufactured by Konica Opto Corporation) and TD80UL (80 μm in thickness, manufactured by Fujifilm Corporation). However, it should not be construed that the invention is limited thereto.

While the embodiment of the VA mode liquid crystal display device has been shown in FIG. 3, the liquid crystal display device of the invention may be an embodiment of a TN mode, an IPS mode, an OCB mode or an ECB mode. Furthermore, in the liquid crystal display device of each display mode, when a structure called "multi-domain", in which one pixel of the liquid crystal display device is divided into plural regions, is employed, the viewing angle characteristic in the up and down, left and right direction is averaged, whereby the display quality is enhanced.

Also, the liquid crystal display device of the invention is not limited to the configuration as shown in FIG. 3, but other members may be included. For example, a color filter may be disposed between the liquid crystal cell and the polarizing film. Also, when the liquid crystal display device of the invention is used as a transmission type, a backlight using a light source of a cold cathode or hot cathode fluorescent tube, or a light emitting diode, a field emission element or an electroluminescent element can be disposed on the back side of the device. Also, the liquid crystal display device of the invention may be of a reflection type. In that case, only one polarizing plate may be disposed on the viewer's side, or a reflection film may be disposed on the back side of the liquid crystal cell or on the inner surface of the lower substrate of the liquid crystal cell. As a matter of course, a front light using the foregoing light source may be disposed on the viewer's side of the liquid crystal cell. Furthermore, in order that the liquid crystal display device of the invention may be satisfied with both a transmission mode and a reflection mode, the device may be of semi-transmission mode in which one pixel of the display device is provided with both a reflection part and a transmission part.

The liquid crystal display device of the invention includes an image direct viewing type device, an image projection type device and an optical modulation type device. An embodiment in which the liquid crystal display device is applied to an active matrix liquid crystal display device using a three-terminal or two-terminal semiconductor element such as TFT or MIM is especially effective in the invention. As a matter of course, an embodiment in which the liquid crystal display device is applied to a passive matrix liquid crystal display device represented by an STN type called "time-division drive" is also effective.

[White-Level Brightness Viewing Angle]

In this specification, a range of a polar angle (tilt angle from the normal) which becomes 50% relative to the white-level brightness in the front direction is called a white-level brightness angle. In the invention, a viewing angle in which the white-level viewing angle is a polar angle of 50° or more in the omnidirectional angle is realized.

[Tint of Black Display]

The tint of the front direction replies upon the polarizing film, whereas the tint from the oblique direction varies depending upon wavelength dispersion of the optically compensatory layer of the optically compensatory sheet and wavelength dispersion of the liquid crystal to be used in the cell. Also, it is possible to make the transmittance of each of R, G and B pixels minimum by adjusting a cell gap of each of R, G and B pixels.

[Support]

A transparent support of each of the optically compensatory sheets (VA 3, VA 10 and VA 12) is composed of at least one polymer film. The optical anisotropy as defined in the invention can also be achieved by configuring the transparent support of plural polymer films. However, it is also possible to realize the optical anisotropy as defined in the invention by a single polymer film. Accordingly, it is especially preferable that the transparent support is composed of a single polymer film. Concretely, the optical anisotropy of the transparent support as referred to herein means that the transparent support has an Re retardation value as measured using light having a wavelength of 632.8 nm in the range of from 10 to 70 nm and an Rth retardation value as measured using light having a wavelength of 632.8 nm in the range of from 50 to 400 nm. In the case where two optically anisotropic polymer films are used in the liquid crystal display device, it is preferable that the single film has an Rth retardation value of from 50 to 200 nm. In the case where a single optically anisotropic polymer film is used in the liquid crystal display device, it is preferable that the film has an Rth retardation value of from 70 to 400 nm.

An average value of a slow axis angle of the polymer film is preferably not more than 3°, more preferably not more than 2°, and most preferably not more than 1°. A direction of the average value of the slow axis angle is defined as an average direction of the slow axis. Also, a standard deviation of the slow axis angle is preferably not more than 1.5°, more preferably not more than 0.8°, and most preferably not more than 0.4°. The angle of the slow axis in the polymer film plane is defined by an angle formed by the slow axis and a standard line (0°) which is a stretching direction of the polymer film. When the roll-shaped film is stretched in a width direction, the width direction is defined as the standard line; and when it is stretched in a longitudinal direction, the longitudinal direction is defined as the standard line. The polymer film preferably has a light transmittance of 80% or more. The polymer film preferably has a photoelastic constant of not more than $60 \times 10^{-12}$ m$^2$/N.

In the transmission type liquid crystal display device using an optically compensatory sheet, there may be the case where after a lapse of time after turning on electricity, "picture frame-like display unevenness" is generated in the surroundings of a screen. This unevenness is caused due to an increase of the transmittance in the surroundings of a screen and in particular, becomes remarkable at the time of black display. In the transmission type liquid crystal display device, the heat generation from a backlight occurs, and temperature distribution is generated in the liquid crystal cell plane. What the optical characteristic (for example, a retardation value and a slow axis angle) of the optically compensatory sheet is changed by this temperature distribution is a cause of the generation of "picture frame-like display unevenness". Since the change of the optical characteristic of the optically compensatory sheet is caused due to the generation of elastic deformation in the optically compensatory sheet because expansion or shrinkage of the optically compensatory sheet due to the temperature increase is suppressed by the adhesion to the liquid crystal cell or polarizing plate.

In order to suppress the "display unevenness" generated in the transmission type liquid crystal display device, it is preferable to use a polymer film with high heat conductivity for the transparent support of the optically compensatory sheet. Examples of the polymer with high heat conductivity include cellulose based polymers such as cellulose acetate (heat conductivity (hereinafter the same): 0.22 W/(m·K)); polyester based polymers such as polycarbonate (0.19 W/(m·K)); and cyclic polyolefin polymers such as norbornene based polymers (0.20 W/(m·K)).

Commercially available polymers, for example, commercially available norbornene based polymers (for example, ARTON, manufactured by JSR Corporation; ZEONOR, manufactured by Zeon Corporation; and NEONEX, manufactured by Zeon Corporation) may be used. Polycarbonate based copolymers are described in JP-A-10-176046 and JP-A-2001-253960.

An aromatic compound having at least two aromatic rings can be used as a retardation raising agent because the retardation of the polymer film can be adjusted.

In the case where a cellulose acetate film is used as the polymer film, the aromatic compound is used in an amount ranging from 0.01 to 20 parts by mass based on 100 parts by mass of the cellulose acetate. The aromatic compound is preferably used in an amount ranging from 0.05 to 15 parts by mass, and more preferably ranging from 0.1 to 10 parts by mass based on 100 parts by mass of the cellulose acetate.

The aromatic ring of the aromatic compound includes, in addition to an aromatic hydrocarbon ring, an aromatic heterocyclic ring.

The retardation raising agent preferably has a molecular weight of from 300 to 800.

The retardation raising agent is described in JP-A-2000-111914, JP-A-2000-275434, JP-A-2001-166144 and WO 00/02619.

It is preferable that the polymer film is produced by a solvent casting method. In the solvent casting method, the film is produced using a solution (dope) having a polymer dissolved in an organic solvent. It is preferable that the organic solvent includes a solvent selected among an ether having from 2 to 12 carbon atoms, a ketone having from 3 to 12 carbon atoms, an ester having from 2 to 12 carbon atoms and a halogenated hydrocarbon having from 1 to 6 carbon atoms.

Each of the ether, ketone and ester may have a cyclic structure. A compound having any two or more of functional groups of an ether, a ketone and an ester (namely, —O—, —CO— and —COO—) can also be used as the organic solvent. The organic solvent may have other functional group such as an alcoholic hydroxyl group.

Examples of the ether include diisopropyl ether, dimethoxymethane, dimethoxyethane, 1,4-dioxane, 1,3-dioxolane, tetrahydrofuran, anisole and phenetole. Examples of the ketone include acetone, methyl ethyl ketone, diethyl ketone, diisobutyl ketone, cyclohexanone and methylcyclohexanone. Examples of the ester include ethyl formate, propyl formate, pentyl formate, methyl acetate, ethyl acetate and pentyl acetate. Examples of the organic solvent having two or more kinds of functional groups include 2-ethoxyethyl acetate, 2-methoxyethanol and 2-butoxyethanol. The carbon atom number of the halogenated hydrocarbon is preferably 1 or 2, and most preferably 1. The halogen of the halogenated hydrocarbon is preferably chlorine. The proportion at which the hydrogen atom of the halogenated hydrocarbon is substituted with a halogen is preferably from 25 to 75% by mole, more preferably from 30 to 70% by mole, further preferably from 35 to 65% by mole, and most preferably from 40 to 60% by mole. Methylene chloride is a representative halogenated hydrocarbon. A mixture of two or more kinds of organic solvents may also be used.

The polymer solution can be prepared by a general method. The "general method" as referred to herein means a treatment at a temperature of 0° C. or higher (ordinary temperature or high temperatures). The preparation of the solution can be carried out by using a preparation method of a dope and an apparatus in a usual solvent casting method. In case of the general method, it is preferable to use a halogenated hydrocarbon (in particular, methylene chloride) as the organic solvent. The polymer solution is prepared in such a manner that the polymer is contained in the solution in an amount of from 10 to 40% by mass. The amount of the polymer is more preferably from 10 to 30% by mass. An arbitrary additive as described later may be added in the organic solvent (prime solvent). The solution can be prepared by stirring a polymer and an organic solvent at ordinary temperature (from 0 to 40° C.). The solution with high concentration may be stirred under a pressure and heating condition. Concretely, a polymer and an organic solvent are charged in a pressure vessel and sealed, and the mixture is stirred while heating at a temperature in the range of a boiling point of the solvent at ordinary temperature or higher under pressure and not higher than a temperature at which the solvent does not boil. The heating temperature is usually 40° C. or higher, preferably from 60 to 200° C., and more preferably from 80 to 110° C.

The respective components may be roughly mixed in advance and then charged in a vessel. Also, the components may be thrown into the vessel successively. The vessel is required to be configured such that stirring can be achieved. The vessel can be pressurized by injecting an inert gas such as a nitrogen gas thereinto. Also, an increase of a vapor pressure of the solvent due to heating may be utilized. Alternatively, after sealing the vessel, the respective components may be added under pressure.

In case of heating, it is preferable that the heating is carried out from the outside of the vessel. For example, a jacket type heating device can be used. Also, the whole of the vessel can be heated by providing a plate heater in the outside of the vessel, piping and circulating a liquid.

It is preferable to provide a stirring blade in the inside of the vessel and achieve stirring by using this. The stirring blade is preferably one having a length such that it reaches in the vicinity of a wall of the vessel. It is preferable that a scraping blade is provided at the terminal end of the stirring blade for the purpose of renewing a liquid film of the wall of the vessel.

Measuring instruments such as a pressure gauge and a thermometer may be provided in the vessel. In the vessel, the respective components are dissolved in a solvent. The prepared dope is cooled and then taken out from the vessel, or taken out from the vessel and then cooled by using a heat exchanger or the like.

The polymer solution (dope) can also be prepared by a cooling dissolution method. First of all, a polymer is gradually added in an organic solvent at a temperature around room temperature (from −10 to 40° C.) while stirring. In case of using plural solvents, the addition order thereof is not limited. For example, after adding a polymer in a prime solvent, other solvent (for example, a gelling solvent such as alcohols) may be added. Conversely, a prime solvent after previously wetting a polymer with a gelling solvent may be added, and such is effective for preventing heterogeneous dissolution from occurring. It is preferable that the amount of the polymer is adjusted such that from 10 to 40% by mass of the polymer is contained in this mixture.

The amount of the polymer is more preferably from 10 to 30% by mass. Furthermore, an arbitrary additive as described later may be added in the mixture.

Next, the mixture is cooled to a temperature of from −100 to −10° C. (preferably from −80 to −10° C., more preferably from −50 to −20° C., and most preferably from −50 to −30° C.). The cooling can be carried out in, for example, a dry ice/methanol bath (−75° C.) or a cooled diethylene glycol solution (from −30 to −20° C.). By performing cooling in such a manner, the mixture of a polymer and an organic solvent is solidified. Though the cooling rate is not particularly limited, in case of batchwise cooling, the viscosity of the polymer solution increases following cooling, and the cooling efficiency is deteriorated. Therefore, it is necessary to use a still with good efficiency for the purpose of reaching a prescribed cooling temperature.

In the cooling dissolution method, the polymer solution after swelling may be transferred within a cooling unit set up at a prescribed cooling temperature within a short period of time. It is preferable that the cooling rate is as fast as possible. However, 10,000° C./sec is a theoretical limit; 1,000° C./sec is a technical limit; and 100° C./sec is a practical limit. The cooling rate is a value obtained by dividing a difference between a temperature at which cooling is started and a final cooling temperature by a time of from the start of cooling to the arrival at the final cooling temperature. Furthermore, when the resulting mixture is further heated to a temperature of from 0 to 200° C. (preferably from 0 to 150° C., more preferably from 0 to 120° C., and most preferably from 0 to 50° C.), a solution having the polymer flown in the organic solvent is formed. The temperature rise may be achieved by merely allowing the mixture to stand at room temperature or by heating in a warm bath.

A uniform solution is thus obtained in the foregoing manner. In the case where the dissolution is insufficient, the cooling or heating operation may be repeated. Whether or not the dissolution is sufficient can be judged merely by visual observation of the appearance of the solution. In the cooling dissolution method, in order to avoid the incorporation of moisture due to dew condensation at the cooling, it is desirable to use a sealed vessel. Also, in the cooling or heating operation, when pressurization is carried out at the cooling, or evacuation is carried out at the heating, the dissolution time can be shortened. In order to carry out the pressurization or evacuation, it is desirable to use a pressure vessel.

In a 20% by mass solution obtained by dissolving a cellulose acylate (acetylation degree: 60.9%, viscosity average polymerization degree: 299) in methyl acetate by a cooling dissolution method, according to differential scanning calorimetry (DSC), a pseudo-phase transition point between a sol state and a gel state exists in the vicinity of 33° C., and the solution becomes in a uniform gel state at a temperature of no higher than this temperature. Accordingly, this solution is required to be stored at a temperature of the pseudo-phase transition temperature or higher, and preferably a temperature of about 10° C. higher than the gel phase transition temperature. However, this pseudo-phase transition temperature varies with the acylation degree and viscosity average polymerization degree of the cellulose acylate, the solution concentration and the organic solvent to be used.

A polymer film is produced from the prepared polymer solution (dope) by a solvent casting method. Also, it is preferable to add the foregoing retardation raising agent to the dope.

The dope is cast on a drum or a band, and the solvent is vaporized to form a film. The concentration of the dope before casting is preferably adjusted in the range of from 10 to 40%, and more preferably from 15 to 35% in terms of a solids content. It is preferable that the surface of the drum or band is mirror-finished. The casting and drying method in the solvent casting method is described in U.S. Pat. Nos. 2,336,310, 2,367,603, 2,492,078, 2,492,977, 2,492,978, 2,607,704, 2,739,069 and 2,739,070, U.K. Patents Nos. 640,731 and 736,892, JP-B-45-4554, JP-B-49-5614, JP-A-60-176834, JP-A-60-203430 and JP-A-62-115035. It is preferable that the dope is cast on a drum or a band having a surface temperature of not higher than 40° C. It is preferable that after casting, air is blown for 2 seconds or more to achieve drying. The resulting film is stripped off from the drum or band and further dried by high-temperature air while successively changing the temperature from 100° C. to 160° C., whereby the residual solvent can be evaporated. The foregoing method is described in JP-B-5-17844. According to this method, it is possible to shorten a time of from casting to stripping-off. In order to achieve this method, it is necessary that the dope is gelled at the surface temperature of the drum or band at the casting.

Plural polymer solutions may be cast. In case of casting plural polymer solutions, a film can be prepared while casting each polymer-containing solution from plural casting nozzles provided at intervals in the movement direction of the support and stacking (methods described in, for example, JP-A-61-158414, JP-A-1-122419 and JP-A-11-198285). Also, the formation of a film can also be carried out by casting the polymer solutions from two casting nozzles (methods described in, for example, JP-B-60-27562, JP-A-61-94724, JP-A-61-94725, JP-A-61-104813, JP-A-61-158413 and JP-A-6-134933). Furthermore, a polymer film casting method in which a flow of a high-viscosity cellulose acylate solution is encompassed by a low-viscosity cellulose acylate solution, and the high-viscosity and low-viscosity cellulose acylate solutions are simultaneously extruded (a method described in JP-A-56-162617) can also be employed.

A method in which a film is prepared by using two casting nozzles, stripping off a film formed on a support by a first casting nozzle and then subjecting the side of the film coming into contact with the support surface to second casting can also be carried out (a method described in JP-B-44-20235). With respect to the plural polymer solutions, the same solution may be used. For the purpose of making plural polymer layers have a different function, a polymer solution corresponding to each function may be extruded from each casting nozzle.

The polymer solution can be cast simultaneously with other functional layers (for example, an adhesive layer, a dye layer, an antistatic layer, an anti-halation layer, an ultraviolet ray absorbing layer and a polarizing layer).

In conventional single-layer solutions, in order to bring the film with a necessary thickness, it is required to extrude a high-viscosity cellulose acylate solution in a high concentration. In that case, there was often encountered a problem that the stability of the polymer solution is so poor that solids are generated, thereby causing a spitting fault or inferiority in flatness. As a method for solving this problem, by casting plural polymer solutions from casting nozzles, high-viscosity solutions can be extruded onto the support at the same time, and a film having improved flatness and excellent surface properties can be prepared. Furthermore, by using concentrated polymer solutions, a reduction of a drying load can be achieved, and the production speed of the film can be enhanced.

In order to improve the mechanical physical properties or increasing the drying speed, a plasticizer can be added in the polymer film. As the plasticizer, a phosphoric ester or a carboxylic acid ester is used. Examples of the phosphoric ester include triphenyl phosphate (TPP) and tricresyl phosphate (TCP). As the carboxylic acid, a phthalic ester and a citric ester are representative. Examples of the phthalic ester include dimethyl phthalate (DMP), diethyl phthalate (DEP), dibutyl phthalate (DBP), dioctyl phthalate (DOP), diphenyl phthalate (DPP) and diethylhexyl phthalate (DEHP). Examples of the citric ester include triethyl O-acetylcitrate (OACTE) and tributyl O-acetylcitrate (OACTB). Examples of other carboxylic acid esters include butyl oleate, methylacetyl ricinolate, dibutyl sebacate and various trimellitic esters. Phthalic ester based plasticizers (for example, DMP, DEP, DBP, DOP, DPP and DEHP) are preferably used. DEP and DPP are especially preferable.

The addition amount of the plasticizer is preferably from 0.1 to 25% by mass, more preferably from 1 to 20% by mass, and most preferably from 3 to 15% by mass relative to the amount of the polymer.

In the polymer film, a deterioration preventive agent (for example, an antioxidant, a peroxide decomposing agent, a radical inhibitor, a metal inactivating agent, an acid scavenger and an amine) may be added. The deterioration preventive agent is described in JP-A-3-199201, JP-A-5-197073, JP-A-5-194789, JP-A-5-271471 and JP-A-6-107854. The addition amount of the deterioration preventive agent is preferably from 0.01 to 1% by mass, and more preferably from 0.01 to 0.2% by mass relative to the solution (dope) to be prepared. When the addition amount is less than 0.01% by mass, an effect by the deterioration preventive agent is not substantially revealed. On the other hand, when the addition amount exceeds 1% by mass, there may be the case where bleed-out of the deterioration preventive agent onto the film surface is revealed. Examples of the deterioration preventive agent which is especially preferable include butylated hydroxytoluene (BHT) and tribenzylamine (TBA).

In the prepared polymer film, the retardation can be further adjusted by a stretching treatment. The stretch ratio is preferably from 3 to 100%. The thickness of the polymer film after stretching is preferably from 20 to 200 μm, and more preferably from 30 to 100 μm. By adjusting the condition of the stretching treatment, it is possible to minimize a standard deviation of the slow axis angle of the optically compensatory sheet. The stretching treatment can be carried out using a tenter. In subjecting the filmed prepared by the solvent casting method to lateral stretching using a tenter, by controlling the state of the film after stretching, it is possible to minimize a standard deviation of the slow axis angle of the film. Concretely, the stretching treatment for adjusting the retardation value using a tenter is performed, and by holding the polymer film immediately after stretching at a temperature in the vicinity of the glass transition temperature of the film at a stretch ratio of from a maximum stretch ratio to a stretch ratio of ½ of the maximum stretch ratio, it is possible to minimize the standard deviation of the slow axis angle. When this holding is performed at a temperature of the film lower than the glass transition temperature, the standard deviation becomes large.

Also, in carrying out longitudinal stretch between rolls, by widening a distance between the rolls, it is also possible to minimize the standard deviation of the slow axis angle.

In the case where the polymer film is made to function as a transparent protective film of the polarizing film in addition to the function as a transparent support of the optically compensatory sheet, it is preferable that the polymer film is subjected to a surface treatment.

The surface treatment is carried out by a corona discharge treatment, a glow discharge treatment, a flame treatment, an acid treatment, an alkali treatment or an ultraviolet ray irradiation treatment. Of these, an acid treatment or an alkali treatment is preferable; and an alkali treatment is more preferable. In the case where the polymer is cellulose acetate, the acid treatment or alkali treatment is carried out as a saponification treatment against the cellulose acetate.

<<Elliptically Polarizing Plate>>

In the invention, an elliptically polarizing plate in which the foregoing optically anisotropic layer is integrated with a linear polarizing film can be used. It is preferable that the elliptically polarizing plate is formed in a shape substantially the same as that of the pair of substrates configuring a liquid crystal cell such that it is able to be directly built in a liquid crystal display device (for example, when the liquid crystal cell is rectangular, the elliptically polarizing plate is preferably shaped in the same rectangular form). In the invention, the alignment axis of the substrate of the liquid crystal cell and the absorption axis of the linear polarizing film and/or the alignment axis of the optically anisotropic layer are adjusted at a specified angle.

The foregoing elliptically polarizing plate can be prepared by stacking the foregoing optically compensatory sheet and a linear polarizing film (hereinafter, the case of merely referring to "polarizing film" is meant to indicate "linear polarizing film"). The optically anisotropic layer may also serve also as the protective film of the linear polarizing film.

The linear polarizing film is preferably a coating type polarizing film represented by a product of Optiva Inc., or a polarizing film composed of a binder and iodine or a dichroic dye. Iodine and the dichroic dye in the linear polarizing film reveal polarization performance upon being aligned in the binder. It is preferable that iodine and the dichroic dye are aligned along the binder molecule, or the dichroic dye is aligned in one direction through self-organization as in a liquid crystal. At present, commercially available polarizing films are generally produced by dipping a stretched polymer in a solution of iodine or a dichroic dye in a bath, thereby make the iodine or dichroic dye penetrate into the binder.

In commercially available polarizing films, the iodine or dichroic dye is distributed in a depth of approximately 4 μm from the polymer surface (approximately 8 μm in total in the both sides), and in order to obtain sufficient polarization performance, a thickness of at least 10 μm is required. The degree of penetration can be controlled by the concentration of the solution of iodine or a dichroic dye, the temperature of the bath tank containing the same, and the immersion time of the same. As described previously, a lower limit of the binder thickness is preferably 10 μm. On the other hand, an upper limit of the thickness is not particularly limited. From the viewpoint of light leakage of a liquid crystal display device, it is preferable that the thickness is thin as far as possible. The binder thickness is preferably not more than that of a commercially available polarizing plate (about 30 μm), more preferably not more than 25 μm, and further preferably not more than 20 μm. When the binder thickness is not more than 20 μm, the light leakage phenomenon is not observed in a 17-inch liquid crystal display device.

The binder of the polarizing film may be crosslinked. As the crosslinked binder, a polymer which is crosslinkable by itself can be used. The polarizing film can be formed by subjecting a functional group-containing polymer or a binder obtained by introducing a functional group into a polymer to reaction of the binders with each other by light, heat or a change in the pH. Also, a crosslinking structure may be introduced into a polymer by a crosslinking agent. In general, the crosslinking is carried out by coating a coating solution containing a polymer or a mixture of a polymer and a crosslinking agent on a transparent support, followed by heating. Since it is only required that the durability is ensured at the stage of a final product, the crosslinking treatment may be carried out at any stage until a final polarizing plate is obtained.

As the binder of the polarizing film, any polymer which is crosslinkable by itself or a polymer which is crosslinked by a crosslinking agent can be used. Examples of the polymer may be the same as those described previously in the section of the alignment film. Above all, polyvinyl alcohol and modified polyvinyl alcohol are the most preferable. Modified polyvinyl alcohol is described in JP-A-8-338913, JP-A-9-152509 and JP-A-9-316127. Two or more kinds of polyvinyl alcohol and modified polyvinyl alcohol may be used in combination.

The addition amount of the crosslinking agent of the binder is preferably from 0.1 to 20% by mass relative to the binder. According to this, the alignment properties of the polarizing element and the wet heat resistance of the polarizing film become satisfactory.

After completion of the crosslinking reaction, the polarizing film may contain an unreacted crosslinking agent in some degree. However, the amount of the residual crosslinking agent is preferably not more than 1.0% by mass, and more preferably not more than 0.5% by mass in the polarizing film. According to this, even when the polarizing film is built in a liquid crystal display device and used for a long period of time or allowed to stand in a high-temperature high-humidity atmosphere for a long period of time, a lowering of the degree of polarization of the polarizing film is not generated.

The crosslinking agent is described in U.S. Reissue Pat. No. 23297. Boron compounds (for example, boric acid and borax) can also be used as the crosslinking agent.

Examples of the dichroic dye which is useful include azo based dyes, stilbene based dyes, pyrazolone based dyes, triphenylmethane based dyes, quinoline based dyes, oxazine based dyes, thiazine based dyes and anthraquinone based dyes. The dichroic dye is preferably soluble in water. The dichroic dye preferably has a hydrophilic substituent (for example, sulfo, amino and hydroxy).

Examples of the dichroic dye include compounds described in, for example, *Journal of Technical Disclosure* No. 2001-1745, page 58.

For increasing a contrast ratio of the liquid crystal display device, it is desirable that the transmittance of the polarizing plate is higher and that the degree of polarization is also higher. The transmittance of the polarizing plate is preferably in the range of from 30 to 50%, more preferably in the range of from 35 to 50%, and most preferably in the range of from 40 to 50% in light having a wavelength of 550 nm. The degree of polarization is preferably in the range of from 90 to 100%, more preferably in the range of from 95 to 100%, and most preferably in the range of from 99 to 100% in light having a wavelength of 550 nm.

<<Production of Elliptically Polarizing Plate>>

In the stretching method, the stretch ratio is preferably from 2.5 to 30.0 times, and more preferably from 3.0 to 10.0 times. The stretching can be carried out by dry stretching in air. Also, the stretching may be carried out by wet stretching in a state of dipping in water. The stretch ratio in dry stretching is preferably from 2.5 to 5.0 times; and the stretch ratio in wet stretching is preferably from 3.0 to 10.0 times. In the stretching step, oblique stretching may be effected a few times. Stretching the film a few times makes it possible to stretch the film more uniformly to a high stretch ratio. Before oblique stretching, the film may be stretched in the lateral or longitudinal direction in some degree (in such a degree that the shrinkage in the width direction can be prevented). The stretching can be carried out using a tenter for biaxial stretching, for which the right side and the left side of the film are stretched differently. The foregoing biaxial stretching may be the same as that in the usual film fabrication. In the biaxial stretching, the film is stretched at different right and left speeds, and therefore, the thickness of the binder film before stretching is required to be different between the right side and the left side of the film. In the film fabrication by means of casting, when a die to be used is tapered, the flow rate of the binder solution between the right side and the left side of the film to be formed can be differentiated.

In the rubbing treatment, a rubbing method which is widely employed for the liquid crystal alignment treatment in LCD can be applied. That is, the alignment is obtained by rubbing the surface of the film in a fixed direction using paper, gauze, felt, rubber or nylon or polyester fibers. In general, by using a cloth produced by uniformly planting fibers having a uniform length and a uniform thickness, the film is rubbed a few times for the alignment treatment. Preferably, the degree of circularity, the degree of cylindricality and the degree of decentering (eccentricity) of the rubbing roll for use herein are all not more than 30 μm. A wrapping angle of the rubbing roll to the film is preferably from 0.1 to 90°. However, a stable rubbing treatment may be obtainable by winding the film around the roll by 360° or more as described in JP-A-8-160430.

In the case where a longitudinal film is subjected to a rubbing treatment, it is preferable that the film is conveyed by a conveyor under a constant tension at a speed of from 1 to 100 m/min. The rubbing roll is preferably set rotatably in the horizontal direction relative to the film-traveling direction for setting a desired rubbing angle. It is preferable that an appropriate rubbing angle is chosen within the range of from 0 to 60°.

On the surface opposite to the optically anisotropic layer of the linear polarizing film, a surface film is preferably disposed (to have a configuration of optically anisotropic layer/polarizing film/polymer film). Preferably, the surface film is provided with an antireflection film having anti-fouling properties and scar resistance on its most superficial layer. The antireflection film may be any known one.

Also, by bringing the surface film with scattering properties, it is possible to enhance in-plane uniformity of the display surface, enlarge a viewing angle or prevent glare on the screen surface. In particular, when a converging film (VA 18) of the backlight has a periodic structure such as a prism shape, moiré (fringe-shaped or concentric) display unevenness is generated due to the display pixel period and light interference. The light scattering film is able to solve the display unevenness by weakening a shade of light to be caused due to this periodic structure.

It is preferable that the optical member having light scattering properties of the invention is a light scattering film having at least a light scattering layer on a transparent support. The light scattering layer may have a function to scattering light and may have other functions. However, the light scattering layer is preferably in a form having internal scattering properties and/or surface scattering properties, and more preferably having both antiglare properties to be caused due to surface scattering properties and hard coat properties. Also, the light scattering film according to the invention is preferably an antireflection film having, in addition to a light scattering layer, an antireflection layer capable of reducing a reflectance using a principle of optical interference. In the following description, the light scattering film is meant to include an antireflection film having the foregoing configuration unless otherwise indicated.

It is preferable that the light scattering layer has a translucent resin and a translucent particle dispersed in the translucent resin. It is preferable that the refractive index of each of the layer configuring the light scattering film according to the invention is satisfied with the following relationship.

(Refractive index of light scattering layer)>(Refractive index of low refractive index layer)

In the invention, the light scattering layer is preferably in a form having internal scattering properties and/or surface scattering properties, and more preferably having both antiglare properties to be caused due to surface scattering properties and hard coat properties. From the standpoints of costs and simplification of the steps, it is preferable that the light scattering layer is formed of a single layer. However, the light scattering layer may be configured of plural layers of, for example, from two layers to four layers. For the purpose of reducing a whitish-brown color feel to be caused due to surface irregularities, it is preferable to provide an overcoat layer on the light scattering layer with surface irregularities (translucent particle-containing layer). Also, in order to prevent electrification from occurring, it is desirable to provide a transparent conductive layer between the light scattering layer and the transparent support or between the light scattering layer and the low refractive index layer; and it is especially desirable to provide a transparent conductive layer between the light scattering layer and the transparent support. Also, it is more preferable that a transparent conductive layer is provided between the light scattering layer and the transparent support and that a conductive particle is present in the light scattering layer. Also, in addition to the transparent conductive layer, a functional layer such as a moisture-proof layer may be provided between the light scattering layer and the transparent support.

In order to sufficiently reduce glare, it is preferable to make a 5°-mirror reflectance Rs fall within a specified range. The 5°-mirror reflectance Rs is preferably from 0.1% to 2.0%, more preferably 0.1% or more and not more than 1.5%, especially preferably 0.1% or more and not more than 1.2%, further preferably 0.1% or more and not more than 1.0%, and most preferably 0.1% or more and not more than 0.8%. When the 5°-mirror reflectance Rs is too high, the glare is deteriorated.

In order to provide a surface film optimal for an image display device with a large-sized screen, it is preferable to increase a bright room contrast. In order to increase the bright room contrast, an integral reflectance is preferably from 0.2 to 2.0%, more preferably 0.2% or more and not more than 1.8%, especially preferably 0.2% or more and not more than 1.5%, and most preferably 0.2% or more and not more than 1.3%. When the integral reflectance is too high, the glare and bright room contrast are deteriorated. In particular, in the case where a whitish matter is glared from the position of regular reflection of a person who appreciates the display, the deterioration of the bright room contrast is remarkable.

In order to increase the bright room contrast, in addition to the integral reflectance, it is preferable to make a difference between the integral reflectance and the 5°-mirror reflectance Rs fall within a specified range. The difference between the integral reflectance and the 5°-mirror reflectance Rs is preferably from 0.1% to 1.0%, more preferably from 0.15% to 0.8%, and more preferably from 0.2% to 0.6%. When the difference between the integral reflectance and the 5°-mirror reflectance Rs is too large, the contrast is deteriorated. In particular, in the case where a blackish matter is glared from the position of regular reflection of a person who appreciates the display, the deterioration of the bright room contrast is remarkable. On the other hand, when the difference between the integral reflectance and the 5°-mirror reflectance Rs is too small, the surface scattering properties are not sufficient, and an effect for reducing the glare is not satisfactory.

In order to provide a surface film optimal for an image display device with a large-sized screen, it is also preferable to set up neutral properties of tint of reflected light within a specified range. $a^*$ and $b^*$ values of a CIE1976 $L^*$, $a^*$ and $b^*$ color space of regular reflected light against incident light at an incident angle of 5° in a region of a CIE standard light source $D_{65}$ having a wavelength of from 380 nm to 780 nm are preferably ($-7 \leq a^* \leq 7$) and ($-10 \leq b^* \leq 10$), more preferably ($-5 \leq a^* \leq 5$) and ($-7 \leq b^* \leq 7$), and further preferably ($0 \leq a^* \leq 5$) and ($-7 \leq b^* \leq 0$), respectively. By making the $a^*$ and $b^*$ values fall within the preferred ranges, in the case where external light is glared, the reflected tint becomes neutral, and a person who appreciates the display is not concerned about this. It is the most preferable to make the a* and b* values fall within the preferred ranges simultaneously with the foregoing various reflection performances.

In order to realize the foregoing reflection performance and tint, it is preferable to make a refractive index (na) of the light scattering layer and a refractive index (nb) of the low refractive index layer fall within specified ranges, respectively. A difference (na−nb) between the refractive index (na) of the light scattering layer and the refractive index (nb) of the low refractive index layer is 0.04 or more, preferably 0.08 or more and not more than 0.35, more preferably 0.10 or more and not more than 0.30, and especially preferably 0.14 or more and not more than 0.25. In this range of the difference in refractive index, the reflectance can be sufficiently decreased; the glare of a reflected image onto the surface can be sufficiently prevented; the strength of the film is high; and it is possible to prevent the generation of strong tint.

A difference in refractive index (Δna) of the light scattering layer is preferably from 0.001 to 0.300, especially preferably from 0.002 to 0.250, and most preferably from 0.01 to 0.200. When the refractive index of the light scattering layer is too low, the difference in refractive index from the low refractive index layer is small so that the antireflection properties are reduced. On the other hand, when the refractive index of the light scattering layer is too high, raw materials which can be used are limited, leading to undesirable phenomena such as high costs and strong tint. In the invention, the refractive index of the light scattering layer is a value determined from a refractive index of a coating film containing solids exclusive of a translucent particle.

The refractive index (nb) of the low refractive index layer is preferably from 1.20 to 1.46, more preferably from 1.20 to 1.40, and further preferably from 1.30 to 1.38. In order to provide a surface film optimal for an image display device with a large-sized screen, the refractive index of the low refractive index layer is especially preferably from 1.31 to 1.37. When the refractive index of the low refractive index layer is too high, the refractive index becomes high, and it is necessary to increase the refractive index of the light scattering layer because the refractive index is lowered. Therefore, such is not desirable. On the other hand, when the refractive index of the low refractive index layer is too low, the strength of the low refractive index layer is lowered, and therefore, such is not desirable. Also, raw materials which can be used are limited, and the costs are high, and therefore, such is not desirable. Furthermore, in view of realizing a low refractive index, it is preferable that the low refractive index layer is satisfied with the following numerical expression (I).

$$(m\lambda/4) \times 0.7 < n1 \times d1 < (m\lambda/4) \times 1.3 \quad \text{Numerical Expression (I)}$$

In the foregoing expression (I), $\underline{m}$ represents a positive odd number; n1 represents a refractive index of the low refractive index layer; d1 represents a film thickness (nm) of the low refractive index layer; and λ represents a wavelength and is a value in the range of from 500 to 550 nm. What the low refractive index layer is satisfactory with the foregoing numerical expression (I) means that $\underline{m}$ (a positive odd number, usually 1) which is satisfactory with the numerical expression (I) within the foregoing wavelength range is present.

It is preferable to simultaneously control the refractive index of the light scattering layer and the refractive index of the low refractive index layer at specified ranges. It is preferable that the refractive index of the light scattering layer is from 1.48 to 1.63 and that the refractive index of the low refractive index layer is from 1.20 to 1.47; it is more preferable that the refractive index of the light scattering layer is from 1.50 to 1.62 and that the refractive index of the low refractive index layer is from 1.30 to 1.45; it is further preferable that the refractive index of the light scattering layer is from 1.51 to 1.55 and that the refractive index of the low refractive index layer is from 1.30 to 1.38; and it is the most preferable that the refractive index of the light scattering layer is from 1.50 to 1.55 and that the refractive index of the low refractive index layer is from 1.31 to 1.37.

In the light scattering film according to the invention, a configuration in which a layer (high refractive index layer) having a higher refractive index than the light scattering layer and a low refractive index layer are stacked may be employed, or a configuration in which a layer having a middle refractive index (middle refractive index layer), a high refractive index layer and a low refractive index layer are stacked on a light scattering layer and a high refractive index layer may be employed. Each of the middle refractive index layer, the high refractive index layer and the low refractive index layer preferably has a thickness of not more than 200 nm. With respect to the thickness and refractive index of each of the middle refractive index layer, the high refractive index layer and the low refractive index layer, for example, a layer configuration described in JP-A-2003-121606 can be employed. However, from the viewpoints of costs, unevenness, productivity and the like, it is especially preferable to control the reflection performance by making the low refractive index layer fall within the foregoing range without providing a middle refractive index layer or a high refractive index layer between the light scattering layer and the low refractive index layer.

In order to improve the bright room contrast, it is also preferable to control an average tilt angle. The average tilt angle is preferably from 0.1° to 4.0°, especially preferably from 0.2° to 3.0°, more preferably from 0.2° to 2.0°, and most preferably from 0.2° to 1.2°. When the average tilt angle is large, the bright room contrast is deteriorated, whereas when it is small, the glare is deteriorated. In order to make the both characteristics satisfactory, it is preferable that the Sm value is satisfied with the foregoing range together with the average tilt angle; and it is especially preferable that an average tilt angle of from 0.2° to 1.2° and an Sm value of from 50 to 120 μm are simultaneously satisfactory.

In order to provide a surface film having a bright room contrast optimal for an image display device with a large-sized screen and a satisfactory effect for reducing the glare, it is necessary to optimally design the reflection performance and tint. In order to achieve this, it is the most preferable to make the surface irregularities fall within a specified range simultaneously with the refractive index of the light scattering layer and the refractive index of the low refractive index layer; it is the most preferable that a refractive index of the light scattering layer of from 1.50 to 1.55, a refractive index of the low refractive index layer of from 1.31 to 1.37 and an Ra value of from 0.08 to 0.13 μm are simultaneously satisfactory. Further preferably, it is simultaneously set up the Sm value and the average tilt angle at the foregoing ranges, respectively.

A surface haze and an internal haze can be measured by the following procedures.

(1) A total haze value (H) of the film is measured according to JIS K7136.

(2) A few drops of silicone oil is added on the front surface of the film in the side of the low refractive index layer and the back surface thereof; the film is sandwiched by two sheets of a glass plate having a thickness of 1 mm (MICRO SLIDE GLASS Product No. S9111, manufactured by Matsunami Glass Ind., Ltd.) from the front and back sides, thereby bringing the film into complete intimate contact with the two glass plates; a haze is measured in a state of eliminating a surface haze; and a value obtained by subtracting a haze as separately measured by putting only silicone oil between two sheets of a glass plate therefrom is calculated as an internal haze (Hi) of the film.

(3) A value obtained by subtracting the internal haze (Hi) as calculated above in (2) from the total haze (H) as measured above in (1) is calculated as a surface haze (Hs).

The total haze (H) value is preferably from 5% to 50%, more preferably from 7% to 40%, and most preferably from 10% to 35%.

In case of an optical member with no surface scattering properties, specifically in the case where the surface haze (Hs) is less than 1%, the internal haze (Hi) value is preferably from 1% to 40%, more preferably from 5% to 35%, and most preferably from 7% to 30%.

The light scattering film according to the invention preferably has an image sharpness, as measured in conformity with JIS K7105 at an optical comb width of 0.5 mm, of from 5% to 80%, more preferably from 10% to 60%, and further preferably from 15% to 55%. When the image sharpness is low, the bright room contrast is deteriorated, whereas when it is high, the glare is deteriorated.

[Light Scattering Layer]

For the purpose of imparting antiglare properties due to surface scattering and internal scattering properties, preferably hard coat properties for enhancing the scar resistance of the film to the film, the light scattering layer is formed. Accordingly, the light scattering layer preferably contains a translucent resin capable of imparting hard coat properties or a translucent particle for imparting antiglare properties or internal scattering properties.

(Translucent Particle)

The translucent particle preferably has an average particle size of from 6 to 12 µm, more preferably from 6 to 10 µm, and further preferably from 6 to 8 µm. When the average particle size is small, the average tilt angle becomes large, and the bright room contrast tends to be deteriorated. Also, the scattering in a high-angle direction to be caused due to internal scattering properties of light becomes large; the dark room contrast is deteriorated; and letter blurs of the display are caused. Therefore, such is not desirable. Also, when the particle size is too large, in order to obtain a preferable surface form, the film thickness becomes thick; the curl is deteriorated; and material costs are high. Therefore, such is not desirable.

Specific examples of the translucent particle which are preferable include resin particles such as a poly((meth)acrylate) particle, a crosslinked poly((meth)acrylate) particle, a polystyrene particle, a crosslinked polystyrene particle, a crosslinked poly(acryl-styrene) particle, a melamine resin particle and a benzoguanamine resin particle. Above all, crosslinked resin particles are preferably used; a crosslinked polystyrene particle, a crosslinked poly((meth)acrylate) particle and a crosslinked poly(acryl-styrene) particle are more preferably used; and a crosslinked poly((meth)acrylate) particle is especially preferably used. By adjusting the refractive index of the translucent particle adaptive to the refractive index of each of the translucent particles selected among these particles along with the particle size and kind, it is possible to attain an internal haze and a surface haze of the invention as well as a center line mean roughness. Specifically, as described later, a combination of a translucent resin composed mainly of a trifunctional or polyfunctional (meth) acrylate monomer (refractive index after curing: 1.50 to 1.53) which is preferably used in the light scattering layer of the invention and a translucent particle composed of a crosslinked poly (meth) acrylate based polymer having an acrylic content of from 50 to 100% by mass is preferable, and a combination with crosslinked poly((meth)acrylate) particle is more preferable. Also, an inorganic particle such as coherent silica as described later can be used as the translucent particle.

Also, in the invention, two or more kinds of different particles may be used in combination. It is possible to perform a design while bringing out the characteristic features of plural particles such that a translucent particle having a larger particle size serves to form surface irregularities and impart antiglare properties, whereas a translucent particle having a smaller particle size serves to reduce a rough feel of the surface; that a translucent particle having a larger particle size serves to form surface irregularities and impart antiglare properties, whereas a translucent particle having a smaller particle size serves to impart chiefly internal scattering properties; and that the scattering angle distribution of internal scattering properties is adjusted by two kinds of particles. In case of using two or more kinds of different particles, it is preferable to use the foregoing particle for one of them.

The foregoing translucent particle is preferably blended in an amount of from 5 to 40% by mass, more preferably from 5 to 25% by mass, and further preferably from 7 to 20% by mass in the whole of solids of the light scattering layer. When the content of the translucent particle is less than 5% by mass, the addition effect is insufficient, whereas when it exceeds 40% by mass, problems such as image blur, turbidity of the surface and glare are easily generated.

Also, the coating amount of the translucent particle is preferably from 30 to 2,500 mg/m$^2$, more preferably from 100 to 2,400 mg/m$^2$, further preferably from 600 to 2,300 mg/m$^2$, and especially preferably from 1,000 to 2,000 mg/m$^2$.

The light scattering layer preferably has an average thickness of from 2 to 30 µm, more preferably from 7.5 to 30 µm, especially preferably from 8 to 20 µm, and further preferably from 10 to 16 µm. When the light scattering layer is too thin, the hard coat properties are insufficient, whereas when it is too thick, there may be the case where curl or brittleness is deteriorated, and processing aptitude is lowered. Therefore, it is preferable to make the thickness of the light scattering layer fall within the foregoing range. The average thickness of the diffusion layer can be measured by enlarging a cross-section thereof 5,000 times by an electron microscope, transferring the light scattering layer onto tracing paper as manufactured by Kokuyo Co., Ltd. (SE-TD58: 50 g/m$^2$) and measuring the mass.

The average thickness of the light scattering layer is from 1.4 to 3.5 times, preferably from 1.5 to 3.0 times, more preferably from 1.5 to 2.5 times, and especially preferably from 1.6 to 2.0 times of the average particle size of the translucent particle. In the case where the average thickness of the light scattering layer is from 1.4 to 3.5 times of the average particle size of the translucent particle, the thickness dependency and particle size dependency of the antiglare properties become small. For that reason, even when fluctuation of the thickness due to ribs generated at the time of coating or due to drying unevenness is generated, it is possible to make it hard to recognize surface defects such as ribs and unevenness. The antiglare properties are produced by surface irregularities by projections which are caused due to a three-dimensional steric structure to be formed by an agglomerate of plural particles. Therefore, even when the thickness or particle size is slightly changed, the size of the surface irregularities does not substantially change so that the change in antiglare properties is small. Thus, such is desirable. In the case where a ratio of the average thickness to the average particle size is too small, since the particles exist in a single layer of the film, when the thickness or particle size is slightly changed, the surface irregularities largely change, thereby largely changing the antiglare properties. Also, the bright room contrast is easily deteriorated. On the other hand, when the subject ratio is too large, since an agglomerate of plural particle is buried in the film, surface irregularities are not substantially formed, whereby necessary antiglare properties cannot be obtained.

It is preferable to control the amount of irregularities on the surface of the light scattering film at a specified range. With respect to the shape of surface irregularities of the light scattering film of the invention, its center line mean roughness (Ra) is from 0.01 to 0.30 μm, preferably from 0.05 to 0.30 μm, and more preferably from 0.10 to 0.30 μm. In the case where the light scattering film of the invention is used on the most superficial layer of the display, when Ra is too large, the bright room contrast is deteriorated, whereas when Ra is too small, the glare is deteriorated. A ten-point mean roughness (Rz) is not more than 10 times of Ra; and an average crest/root distance (Sm) is preferably from 2 to 200 μm, especially preferably from 50 to 180 μm, and further preferably from 50 to 150 μm.

In the case where a ratio of the average thickness to the average particle is from 1.4 to 3.5, the average particle size fluctuates due to the particle lot, and the fluctuation of the antiglare properties of the film is small, whereby a film with small lot fluctuation can be obtained. Also, in view of the desired glare and bright room contrast in the invention, when the ratio of the average thickness to the average particle is too small, the bright room contrast is deteriorated, whereas when it is too large, the glare is deteriorated.

In the case where the light scattering film according to the invention is used on the surface of the display, it is preferable that its pencil hardness is high. The pencil hardness is preferably 2 H or more, more preferably from 3 H to 7H, and further preferably from 4H to 6H.

Also, the light scattering film according to the invention has an effect for dissolving moiré (fringe-shaped or concentric) display unevenness which is caused due to light interference between of the converging film capable of enhancing the brightness of a backlight and the display pixel. However, the light scattering film may be disposed on the surface film (VA 17) of the lower polarizing plate in addition to the surface of the display. The light scattering film may be separately disposed as a light scattering film between the converging film (VA 18) and the surface layer (VA 17) of the lower polarizing plate. Alternatively, the light scattering film may be disposed in any portion so far as it is disposed between a pair of the glass substrates (VA 5 and VA 8) for interposing a liquid crystal layer therebetween and the polarizing films (VA 1 and VA 14); may also serve as the optically anisotropic layer (VA 3, VA 10 or VA 12); and may also serve as an adhesive layer or a sticky layer for adhering each film. Furthermore, the light scattering film may also serve as a color filter or a black matrix in the inside of the glass substrates (VA 5 and VA 8), a flattening film or an alignment film.

In addition to the use of a light scattering film, the following are effective as a method for dissolving the moiré (fringe-shaped or concentric) display unevenness which is caused due to light interference between of the converging film capable of enhancing the brightness of a backlight and the display pixel.

(M1) An axis of the pixel pitch direction is crossed with the linear direction of the converging film.

(M2) An absorption axis of the polarizing film is crossed with the linear direction of the converging film or an axis of the pixel pitch direction.

(3) The linear pitch of the converging film is made smaller than the pixel pitch.

Alternatively, a combination of the foregoing (M1), (M2) and (M3) is also effective.

In the foregoing (M1) method, when the axes are parallel, moiré is mostly likely generated. However, since the pixel pitch in a matrix (lattice) state, moiré is also generated even in the vertical alignment. Accordingly, the axis (groove direction) of the converging sheet (prism sheet) is crossed with the pixel pitch at an arbitrary angle (for example, 45°) against the vertical or parallel direction. However, since convergence is carried out in the vertical direction because of the matter that the viewing angle is important in a large-sized display device such as TV, the prism axis direction is preferably a horizontal direction. Accordingly, the crossing angle is from 2° to 20°, and preferably from 5° to 10° against the horizontal direction.

As another method of the foregoing (M1) method, a method in which the pixels are converted from the matrix (lattice) state into a zigzag state may be employed. It is preferable that the axis direction (groove direction) of the converging sheet (prism sheet) is horizontal, with an angle of the alignment of pixels being from 3° to 60°. The crossing angle of the pixel alignment does not affect the viewing angle, and therefore, it is preferably 45°.

In the foregoing (M2) method, the absorption axis of the polarizing plate and the pixels are crossed in a matrix (lattice) state. Usually, the crossing angle between the absorption axis of the polarizing plate and the pixels in the matrix state is horizontal or vertical. The moiré unevenness can be reduced by regulating the crossing angle at from 2° to 20°, and from 5° to 10° against the horizontal direction. At that time, it is preferable that the absorption axes (VA 2 and VA 15) of the upper and lower polarizing films (VA 1 and VA 14) are orthogonally disposed to each other.

In the foregoing (M3) method, in the case where a frequency of the converging film and the pitch is defined as F1, and a frequency of the display pixel pitch (in the longitudinal direction or lateral direction) is defined as F2, when a value of {n×F1−m×F2 (n, m: natural number)} is small, moiré display unevenness is easily generated. By regulating the pitch such that this relationship is not revealed and minimizing the pitch of the converging film, the moiré is hardly generated.

EXAMPLES

The invention is hereunder described in more detail with reference to the following Examples. Materials, reagents, amounts and proportions thereof, operations and the like can be properly changed so far as they do not deviate from the spirit and scope of the invention. Accordingly, it should not be construed that the invention is limited to these Examples.

Example 1

(1) Coating of Light Scattering Layer:

A triacetyl cellulose film (TAC-TD80U, refractive index: 1.49, manufactured by Fujifilm Corporation) having a thickness of 80 μm as a transparent support was unwound in a rolled shape; and a coating solution A for light scattering layer was coated by a die coating method using the following apparatus configuration under the following coating condition was coated. After drying at 30° C. for 15 seconds and further 90° C. for 20 seconds, the coating layer was cured upon irradiation with ultraviolet rays at a dose of 90 mJ/cm$^2$ using an air-cooling metal halide lamp (manufactured by Eyegraphics Co., Ltd.) of 160 W/cm while purging with nitrogen (oxygen concentration: 0.05% by volume), thereby forming a 12 μm-thick light scattering layer having antiglare properties, following by winding up.

Basic Condition

Figure 5:
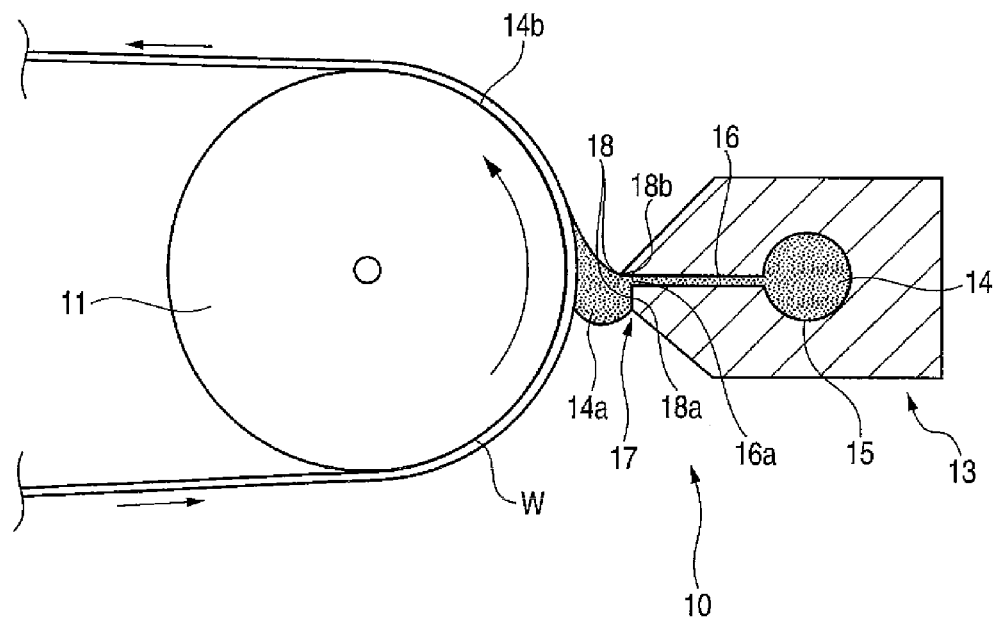
FIG. 5 is a cross-sectional view of a coater using a slot die to be used in the invention.

As a slot die 13 as shown in FIG. 5, one having an upstream side lip land length $I_{UP}$ of 0.5 mm, a downstream side lip land length $I_{LO}$ of 50 μm, a length of an opening of a slot 16 in a web running direction of 150 μm and a length of the slot 16 of 50 mm was used. A gap between a upstream side lip land 18a and a web W was set up at 50 μm longer than a gap between a downstream side lip land 18b and the web W (hereinafter referred as "overbite length of 50 μm"), and a gap between the downstream side lip land 18b and the web W was set up at 50 μm.

In conformity with liquid physical properties of the respective coating solutions, coating was carried out in a wet coating amount of 24 mL/m$^2$ (in case of the coating solution A for light scattering layer), 31 mL/m$^2$ (in case of the coating solution B for light scattering layer), 10.8 mL/m$^2$ (in the case of the coating solution C for light scattering layer) and 10.0 mL/m$^2$ (in case of the coating solution D for light scattering layer), respectively at a coating rate of 20 m/min for a light scattering layer and in a wet coating amount of 5.0 mL/m$^2$ at a coating rate of 30 m/min for a low refractive index layer. A coating width was 1,300 mm, and an effective width was 1,280 mm.

(2) Coating of Low Refractive Index Layer:

The triacetyl cellulose film coated with a light scattering layer by coating the foregoing coating solution A for light scattering layer was again wound out, on which was then coated the following coating solution A for low refractive index layer under the foregoing basic condition; and after drying at 120° C. for 150 seconds and further at 140° C. for 8 minutes, the coating layer was cured upon irradiation with ultraviolet rays at a dose of 300 mJ/cm$^2$ using an air-cooled metal halide lamp (manufactured by Eyegraphics Co., Ltd.) of 240 W/cm while purging with nitrogen (oxygen concentration: 0.05% by volume), thereby forming a low refractive index layer having a thickness of 95 nm, followed by winding up.

(3) Saponification Treatment of Antireflection Film:

After fabrication of the foregoing low refractive index layer, the foregoing sample was subjected to the following treatment. A sodium hydroxide aqueous solution of 1.5 moles/L was prepared and kept at 55° C. A dilute sulfuric acid aqueous solution of 0.01 moles/L was prepared and kept at 35° C. The prepared light scattering film was dipped in the foregoing sodium hydroxide aqueous solution for 2 minutes and then dipped in water, and the sodium hydroxide aqueous solution was thoroughly washed away. Next, the resulting sample was dipped in the foregoing dilute sulfuric acid aqueous solution for one minute and then dipped in water, and the dilute sulfuric acid aqueous solution was thoroughly washed away. Finally, the sample was thoroughly dried at 120° C. There was thus prepared a saponified light scattering film. This is named as a sample 1-1.

| (Preparation of coating solution A for light scattering layer) | |
|---|---|
| PET-30: | 70.0 parts by mass |
| DPHA: | 5.0 parts by mass |
| IRGACURE 184: | 3.0 parts by mass |
| MX-600 (30% MIBK dispersion): | 40.0 parts by mass |

| (Preparation of coating solution A for light scattering layer) | |
|---|---|
| KBM-5103: | 10.0 parts by mass |
| MIBK (methyl isobutyl ketone): | 47.0 parts by mass |
| MEK (methyl ethyl ketone): | 25.0 parts by mass |

| (Preparation of coating solution B for light scattering layer) | |
|---|---|
| PET-30: | 70.0 parts by mass |
| VISCOAT #360: | 12.5 parts by mass |
| IRGACURE 184: | 3.0 parts by mass |
| MX-600 (30% MIBK dispersion): | 21.5 parts by mass |
| KBM-5103: | 8.0 parts by mass |
| MIBK: | 30.0 parts by mass |
| MEK: | 10.0 parts by mass |

| (Preparation of coating solution C for light scattering layer) | |
|---|---|
| PET-30: | 70.0 parts by mass |
| DPHA: | 4.0 parts by mass |
| IRGACURE 184: | 3.0 parts by mass |
| SX-350H (30% MIBK dispersion): | 36.5 parts by mass |
| SX-350H (30% MIBK dispersion): | 3.5 parts by mass |
| KBM-5103: | 10.0 parts by mass |
| MIBK: | 28.0 parts by mass |
| MEK: | 24.0 parts by mass |

| (Preparation of coating solution D for light scattering layer) | |
|---|---|
| PET-30: | 70.0 parts by mass |
| DPHA: | 6.0 parts by mass |
| IRGACURE 184: | 3.0 parts by mass |
| MX-500 (30% MIBK dispersion): | 36.5 parts by mass |
| KBM-5103: | 10.0 parts by mass |
| MIBK: | 85.0 parts by mass |
| MEK: | 30.0 parts by mass |

The used compounds are as follows.

PET-30

Mixture of pentaerythritol triacrylate and penta-erythritol tetraacrylate (manufactured by Nippon Kayaku Co., Ltd.)

DPHA

Mixture of dipentaerythritol pentaacrylate and dipentaerythritol hexaacrylate (manufactured by Nippon Kayaku Co., Ltd.)

VISCOAT #360

Trimethylolpropane ethylene oxide-added triacrylate (manufactured by Osaka Organic Chemical Industry Ltd.)

KBM-5103

Silane coupling agent (manufactured by Shin-Etsu Chemical Co., Ltd.)

IRGACURE 184

Polymerization initiator (manufactured by Ciba Specialty Chemicals)

MX-600

PMMA particles having an average particle size of 6 μm (manufactured by Soken Chemical & Engineering Co., Ltd.)

MX-500

PMMA particles having an average particle size of 5 μm (manufactured by Soken Chemical & Engineering Co., Ltd.)

SX-350H

Polystyrene particle having an average particle size of 3.5 μm (manufactured by Soken Chemical & Engineering Co., Ltd.)

SX-350HL

Polystyrene-PMMA copolymer particle having an average particle size of 3.5 μm (manufactured by Soken Chemical & Engineering Co., Ltd.)

(Preparation of Sol Solution a)

In a reactor equipped with a stirrer and a reflux condenser, 120 parts by mass of methyl ethyl ketone, 100 parts by mass of acryloyloxypropyl trimethoxysilane (KBM-5103, manufactured by Shin-Etsu Chemical Co., Ltd.) and 3 parts by mass of diisopropoxyaluminum ethyl acetoacetate were added and mixed. After adding 30 parts by mass of ion exchanged water, the mixture was allowed to react at 60° C. for 4 hours, followed by cooling to room temperature, thereby obtaining a sol solution a. The reaction product had a mass average molecular weight of 1,600, and among components including oligomer or polymer components, components having a molecular weight of from 1,000 to 20,000 accounted for 100%. Also, the gas chromatographic analysis revealed that the starting acryloyloxypropyl trimethoxysilane did not remain at all.

(Preparation of Dispersion A)

To 500 g of a hollow silica fine particle sol (isopropyl alcohol silica sol, average particle size: 60 nm, shell thickness: 10 nm, silica concentration: 20% by mass, refractive index of silica particle: 1.31; as prepared by changing the size in conformity to Preparation Example 4 of JP-A-2002-79616), 30 g of acryloyloxypropyl trimethoxysilane (manufactured by Shin-Etsu Chemical Co., Ltd.) and 1.5 g of diisopropoxyaluminum ethyl acetoacetate were added and mixed. After adding 9 g of ion exchanged water, the mixture was allowed to react at 60° C. for 8 hours. After cooling to room temperature, 1.8 g of acetyl acetone was added. Solvent substitution was carried out by distillation in vacuo under a pressure of 20 kPa while adding cyclohexanone to 500 g of this dispersion such that the content of silica became constant. The dispersion was free from the generation of a foreign substance. When the solids content was adjusted with cyclohexanone at 20% by mass, the viscosity was found to be 5 mPa·s at 25° C. The residual amount of isopropyl alcohol in the obtained dispersion A was analyzed by gas chromatography. As a result, it was found to be 1.5%.

(Preparation of Coating Solution A for Low Refractive Index Layer)

To 783.3 parts by mass (47.0 parts by mass as a solids content) of OPSTAR JN7228 (heat crosslinking fluorine-containing silicone polymer composition solution (solids content: 6%), manufactured by JSR Corporation), 240 parts by mass (48.0 parts by mass as a solids content of the total sum of silica and surface treating agent) of the foregoing dispersion A and 17.2 parts by mass (5.0 parts by mass as a solids content) of the foregoing sol solution a. The mixture was diluted with cyclohexane and methyl ethyl ketone such that the solids content of the entire coating solution was 6% by mass and that a ratio of cyclohexane to methyl ethyl ketone was 10/90, thereby preparing a coating solution A for low refractive index layer. A layer formed from this coating solution had a refractive index of 1.365.

At that time, the sample 1-1 was measured by a goniophotometer with an acceptance angle of 2°. As a result, a scattered light intensity of a scattered light profile at an output angle 30° against the light source was found to be 1.23×10$^{-5}$. Also, a value of the foregoing evaluation expression (1) was found to be 2.2; and a value of the foregoing evaluation expression (2) was found to be 1.8.

(Modification of Liquid Crystal TV)

A liquid crystal TV, LC-32GS10 Model (manufactured by Sharp Corporation) was disassembled, and all of optical sheets other than a diffusion plate, existing between a backlight and a liquid crystal panel, were removed. A lenticular lens sheet having a period of 145 μm was disposed therein such that the groove direction was in a horizontal direction of the screen, and the TV was again assembled. Next, only the upper polarizing plate surface film on the viewing side was carefully stripped off, and the sample 1-1 was stuck thereon using an adhesive. Also, in a state that a black solid image was displayed by the liquid crystal TV, the black brightness in a dark room circumstance was visually evaluated, and a black-and-white solid image was measured using a brightness meter (color brightness meter "BM-5A", manufactured by Topcon Corporation), thereby evaluating a contrast.

A: Satisfactory, contrast ratio: 1,800 or more

B: Slightly satisfactory, contrast ratio: 1,500 or more and less than 1,800

C: Poor, contrast ratio: less than 1,500

As a result, the evaluation results revealed that Example 1 was rated as "A".

Next, the foregoing liquid crystal TV was visually evaluated with respect to black brightness in a bright room at a luminance of 500 lx. Also, a black solid image was measured from the normal direction of the liquid crystal TV screen using the foregoing brightness meter, thereby evaluating tightness of black display (black tightness).

A: Satisfactory, brightness: less than 3 cd/m$^2$

B: Slightly satisfactory, brightness: 3 cd/m$^2$ or more and less than 5 cd/m$^2$ C: Poor, brightness: 5 cd/m$^2$ or more As a result, the evaluation results revealed that Example 1 was rated as "A".

Furthermore, in a state that a grey solid image was displayed by the liquid crystal TV (gradation: 128/255), the degree of fringe-shaped moiré display unevenness was visually evaluated according to the following criteria.

A: The moiré is not noticeable (brightness ratio of bright area to dark area: less than 0.5%).

B: The moiré is slightly noticeable (brightness ratio of bright area to dark area: from 0.5% to 2.5%).

C: The moiré is noticeable (brightness ratio of bright area to dark area: more than 2.5%)

Reference Example 1

A liquid crystal display device was prepared in the same manner as in Example 1, except for using a sample 1-2 as the light scattering film in place of the sample 1-1. At that time, the level of the contrast was rated as "A"; the level of the moiré was rated as "C"; and the level of the black tightness was rated as "A".

The sample 1-2 was prepared in the same manner as in Example 1, except that the coating solution for light scattering layer was changed from the coating solution A to the coating solution B and that the coating condition was changed to the foregoing condition.

Reference Example 2

A liquid crystal display device was prepared in the same manner as in Example 1, except for using a sample 1-3 as the light scattering film in place of the sample 1-1. At that time, the level of the contrast was rated as "C"; the level of the moiré was rated as "A"; and the level of the black tightness was rated as "B".

The sample 1-3 was prepared in the same manner as in Example 1, except that the coating solution for light scattering layer was changed from the coating solution A to the coating solution C and that the coating condition was changed to the foregoing condition.

Reference Example 3

A liquid crystal display device was prepared in the same manner as in Example 1, except for using a sample 1-4 as the light scattering film in place of the sample 1-1. At that time, the level of the contrast was rated as "A"; the level of the moiré was rated as "A"; and the level of the black tightness was rated as "C".

The sample 1-4 was prepared in the same manner as in Example 1, except that the coating solution for light scattering layer was changed from the coating solution A to the coating solution D and that the coating condition was changed to the foregoing condition.

Example 2

A liquid crystal display device was assembled in the same manner as in Example 1, except for changing the distance between the liquid crystal cell stuck with a light scattering film and the lenticular lens sheet. At that time, the level of the contrast was rated as "A"; the level of the moiré was rated as "A"; and the level of the black tightness was rated as "A".

The results obtained are shown in Table 1. In Example 1 and Reference examples 1 and 2, the distance between the lenticular lens sheet and each of the samples 1-1, 1-2 and 1-3 with light scattering properties was 7.0 mm. On the other hand, in Example 2, the distance between the lenticular lens sheet and the sample 1-1 with light scattering properties was 5.0 mm. Also, the period of the lenticular lens sheet was 0.145 mm in all of the cases. I(30) represents scattered light intensity of a scattered light profile measured by a goniophotometer with an acceptance angle of 2° at an output angle of 30° against the light source. According to this, it is noted that when the value of the evaluation expression (1) falls within the range of from 2.0 to 3.2, and the value of the evaluation expression (2) falls within the range of from 1.6 to 2.6, both the contrast and the moiré are satisfactory.

What is claimed is:

1. A liquid crystal display device comprising: a light source; at least one optical member having a periodic structure of 75 μm or more: pixels disposed in a matrix state: and at least one optical member with light scattering properties, wherein when a scattered light intensity of a scattered light profile measured by a goniophotometer with an acceptance angle of 2° at an output angle θ against the light source is defined as I(θ), the optical member with light scattering properties has a value of the following evaluation expression (1) of from 2.0 to 3.2:

$$I(3) \times d/L \times 1000 \quad (1)$$

wherein d represents a period of the optical member having a periodic structure; and L represents a distance between the optical member having a periodic structure and the optical member with light scattering properties.

2. The liquid crystal display device of claim 1, wherein the at least one optical member having a periodic structure of 75 μm or more has a periodic structure of 100 μm or more.

3. The liquid crystal display device of claim 1, wherein at least one of the at least one optical member having a periodic structure is a lenticular lens sheet.

4. The liquid crystal display device of claim 1, wherein the at least one optical member with light scattering properties is disposed between the at least one optical member having a periodic structure and the pixels disposed in a matrix state.

5. The liquid crystal display device of claim 1, wherein at least one of the at least one optical member with light scattering properties is disposed on an opposite side of the optical member having a periodic structure while sandwiching the pixels disposed in a matrix state.

6. The liquid crystal display device of claim 1, wherein the optical member with light scattering properties has a value of scattering intensity of a scattered light profile measured by a goniophotometer with an acceptance angle of 2° at an output angle of 30° against the light source of from $5.0 \times 10^{-6}$ to $5.0 \times 10^{-5}$.

7. The liquid crystal display device of claim 1, wherein the at least one optical member with light scattering properties has surface light scattering properties.

8. The liquid crystal display device of claim 1, wherein the at least one optical member with light scattering properties has a surface roughness Ra value of from 0.01 to 0.3 μm and an Sm value of from 20 to 200 μm.

TABLE 1

|  | L (mm) | d (mm) | Value of evaluation expression (1) | Value of evaluation expression (2) | I (30) | Contrast | Moiré | Black tightness |
|---|---|---|---|---|---|---|---|---|
| Example 1 | 7.0 | 0.145 | 2.2 | 1.8 | $1.23 \times 10^{-5}$ | A | A | A |
| Example 2 | 5.0 | 0.145 | 3.1 | 2.5 | $1.42 \times 10^{-5}$ | A | A | A |
| Reference example 1 | 7.0 | 0.145 | 1.8 | 1.3 | $1.18 \times 10^{-5}$ | A | C | A |
| Reference example 2 | 7.0 | 0.145 | 1.7 | 2.8 | $7.78 \times 10^{-5}$ | C | A | B |
| Reference example 3 | 7.0 | 0.145 | 1.4 | 3.1 | $4.87 \times 10^{-6}$ | A | A | C |

Although the invention has been described above in relation to preferred embodiments and modifications thereof, it will be understood by those skilled in the art that other variations and modifications can be effected in these preferred embodiments without departing from the scope and spirit of the invention.

9. The liquid crystal display device of claim 1, wherein the at least one optical member with light scattering properties has a haze value of 20% or more.

10. The liquid crystal display device of claim 1, wherein the at least one optical member with light scattering properties is a light scattering film comprising a light scattering layer and a transparent support.

11. The liquid crystal display device of claim 1, wherein the at least one optical member with light scattering properties comprises a particle and a binder, has both surface light scattering properties and particle scattering properties, has a surface roughness Ra of from 0.01 to 0.3 µm and has an Sm value of from 20 to 200 µm; a diameter of the particle is from 6 µm to 12 µm; and a relative refractive index of the particle and the hinder is from 0.95 to 1.05.

12. The liquid crystal display device of claim 1, wherein a direction of periodicity of the pixels disposed in a matrix state is coincident with a direction of periodicity of the optical member having a periodic structure.

13. The liquid crystal display device of claim 1, which has a diagonal length of a screen of 20 inches or more.

14. A liquid crystal display device comprising: a light source: at least one optical member having a periodic structure of 75 µm or more; pixels, disposed in a matrix state: and at least one optical member with light scattering properties, wherein when a scattered light intensity of a scattered light profile measured by a goniophotometer with an acceptance angle of 2° at an output angle θ against the light source is defined as I(θ), the optical member with light scattering properties has a value of the following evaluation expression (2) of from 1.6 to 2.6:

$$(I(0)-I(1.5))\times(1-I(0))/I(0)\times d/L\times 1000 \qquad (2)$$

wherein d represents a period of the optical member having a periodic structure: and L represents a distance between the optical member having a periodic structure and the optical member with light scattering properties.

* * * * *